(12) United States Patent
Ogi et al.

(10) Patent No.: US 9,483,999 B2
(45) Date of Patent: Nov. 1, 2016

(54) LASER PROJECTION DISPLAY DEVICE AND LASER DRIVE CONTROL METHOD

(71) Applicant: Hitachi-LG Data Storage, Inc., Tokyo (JP)

(72) Inventors: Yuya Ogi, Tokyo (JP); Yoshiho Seo, Tokyo (JP); Fumio Haruna, Tokyo (JP); Toshio Ueda, Yokohama (JP); Tomoyuki Nonaka, Yokohama (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 45 days.

(21) Appl. No.: 14/155,558

(22) Filed: Jan. 15, 2014

(65) Prior Publication Data

US 2014/0253527 A1    Sep. 11, 2014

(30) Foreign Application Priority Data

Mar. 8, 2013    (JP) ................................. 2013-046098

(51) Int. Cl.

| | |
|---|---|
| *G06F 3/038* | (2013.01) |
| *G09G 5/00* | (2006.01) |
| *G09G 5/02* | (2006.01) |
| *G09G 3/00* | (2006.01) |
| *G09G 3/02* | (2006.01) |
| *G09G 3/20* | (2006.01) |
| *H04N 9/31* | (2006.01) |

(52) U.S. Cl.

CPC ................ *G09G 5/02* (2013.01); *G09G 3/002* (2013.01); *G09G 3/025* (2013.01); *G09G 3/2081* (2013.01); *H04N 9/3135* (2013.01); *G09G 2320/0238* (2013.01); *G09G 2320/0242* (2013.01); *G09G 2320/0247* (2013.01); *G09G 2320/041* (2013.01); *G09G 2320/0666* (2013.01); *G09G 2320/103* (2013.01); *G09G 2360/145* (2013.01); *G09G 2360/16* (2013.01)

(58) Field of Classification Search

CPC ........ G09G 5/02; G09G 3/002; G09G 3/025; G09G 3/2081; G09G 2320/0238; G09G 2320/242; G09G 2320/041; G09G 2320/0666; G09G 2320/103; G09G 2360/145; G09G 2360/16; G09G 2320/0247; H04N 9/3135

See application file for complete search history.

(56) References Cited

U.S. PATENT DOCUMENTS

2009/0096779 A1*    4/2009    Ikegami ........................ 345/214

FOREIGN PATENT DOCUMENTS

| JP | 2003-5714 A | 1/2003 |
|---|---|---|
| JP | 2006-343397 A | 12/2006 |

* cited by examiner

*Primary Examiner* — Charles Hicks
(74) *Attorney, Agent, or Firm* — Baker Botts L.L.P.

(57) ABSTRACT

A laser projection display device includes: a laser light source drive unit; an attribute amount detection unit for detecting the attribute amount of a picture signal; a light sensor for measuring the light amounts of the laser light sources; and a temperature sensor for measuring the temperatures of the laser light sources. The laser projection display device is configured so that the current vs. light amount output characteristics of the laser light sources with a threshold current and current gain as a parameter are corrected in accordance with the load amount of the picture signal per frame if the change of the attribute amount exceeds a predefined amount; the light sources are driven at a predefined timing of the vertical blanking interval; controls the threshold currents and current gains in accordance with the light amounts; and the threshold currents and current gains are corrected on the basis of the measured temperatures.

11 Claims, 21 Drawing Sheets

FIG.11

| ACL (%) | THRESHOLD CURRENT (mA) | CURRENT GAIN | TEMP. (°C) |
|---|---|---|---|
| 0 | 16.0 | 0.80 | T1 |
| 10 | 17.0 | 0.82 | T3 |
| 20 | 18.0 | 0.84 | T5 |
| ⋮ | ⋮ | ⋮ | ⋮ |
| 100 | 25.0 | 1.00 | Tmax |

FIG.20

| ACCUMULATED ACL | ESTIMATED TEMP. (°C) | THRESHOLD CURRENT (mA) | CURRENT GAIN |
|---|---|---|---|
| 0 | -3 | -2.0 | -0.20 |
| 10 | ±0 | ±0.0 | ±0.0 |
| 20 | +3 | +2.0 | +0.20 |
| ⋮ | ⋮ | ⋮ | ⋮ |
| max | Tmax | 25.0 | 1.00 |

LASER PROJECTION DISPLAY DEVICE AND LASER DRIVE CONTROL METHOD

INCORPORATION BY REFERENCE

This application relates to and claims priority from Japanese Patent Application No. 2013-046098 filed on Mar. 7, 2013, the entire disclosure of which is incorporated herein by reference.

BACKGROUND

The present invention relates to a laser projection display device in which light emitted from a light source such as semiconductor laser is scanned by a two-dimensional scanning mirror such as a MEMS mirror to display an image, and relates to drive control of a laser diode that emits image light.

In recent years, a small-sized projector that uses MEMS technology and a semiconductor laser light source has been widely used. For example, Japanese Unexamined Patent Application Publication No. 2006-343397 and Japanese Unexamined Patent Application Publication No. 2003-5714 disclose a projector that projects a picture by scanning a biaxial MEMS mirror or a biaxial MEMS scanner horizontally and vertically, and at the same time, by modulating a laser light source. A small-sized projector that uses semiconductor laser as described above has a problem in that, because the forward current vs. light amount characteristic of a laser diode used in this projector changes in accordance with the load variation and ambient temperature, the white balance of the display screen changes.

Japanese Unexamined Patent Application Publication No. 2003-5714 proposes a projector that is configured in such a way that a partially-reflecting mirror spatially separates a part of laser light, and temperature compensation is performed by detecting each color of the part of laser light to keep the white balance constant.

SUMMARY

However, in the technology disclosed in Japanese Unexamined Patent Application Publication No. 2003-5714, consideration is not paid to the fact that the load variation of the laser diode is induced by projected picture information, therefore there is a problem in that, in the case where a moving image is projected, the white balance of the projected image varies and the color tone of the moving image changes.

The present invention was achieved with the above-mentioned problem in mind, and the present invention provides a laser projector configured in such a way that the white balance of the projected image does not change in response to an abrupt load variation or an abrupt temperature change.

In order to address the above-mentioned problem, a laser projection display device according to an embodiment of the present invention, in which laser light sources used for emitting plural colors are driven in accordance with a picture signal and laser lights emitted from the laser light sources are scanned to display an image, includes a laser light source drive unit that respectively drives the laser light sources in accordance with the picture signal and an attribute amount detection unit that detects the image attribute amount of the picture signal, and the laser projection display device is configured in such a way that, if the change of the image attribute amount detected by the attribute amount detection unit exceeds a predefined amount, the laser light source drive unit corrects the light amount output characteristics of the laser light sources in accordance with the load amount of the picture signal per frame.

Here, the laser light source drive unit is configured so as to correct the light amount output characteristics of the laser light sources by adjusting and controlling current gains and threshold currents of the laser light sources.

In addition, the laser projection display device includes a light sensor that measures the output light amount of at least one of the laser light sources, and is configured in such a way that the laser light source drive unit drives the at least one laser light source with a first reference signal level at a predefined timing of the vertical blanking interval of the picture signal, controls the threshold current of the at least one laser light source in accordance with a first light amount detected by the light sensor, drives the at least one laser light source with a second reference signal level at a predefined timing of the vertical blanking interval of the picture signal, and controls the current gain of the at least one laser light source in accordance with a second light amount detected by the light sensor and the first light amount.

The laser projection display device further includes a temperature sensor that measures the temperatures of the laser light sources, and is configured so that the current vs. light amount output characteristics of the laser light sources with the threshold current and the current gain as a parameter are corrected on the basis of the temperatures measured by the temperature sensor.

According to the aspects of the present invention, white balance can be kept constant by reducing the change of color balance among R, G, and B laser lights, and because the black floats of the low gradation parts of a display picture can be prevented from occurring, the high-quality display of the picture can be secured.

BRIEF DESCRIPTION OF THE DRAWINGS

FIG. 11 is an explanation diagram showing an example of an LUT of the first embodiment;

FIG. 20 is a reference table showing the relation between accumulated ACLs and estimated temperatures and the relation between estimated temperatures and threshold current adjusting values/current gain adjusting values.

DETAILED DESCRIPTION

Figure 1:
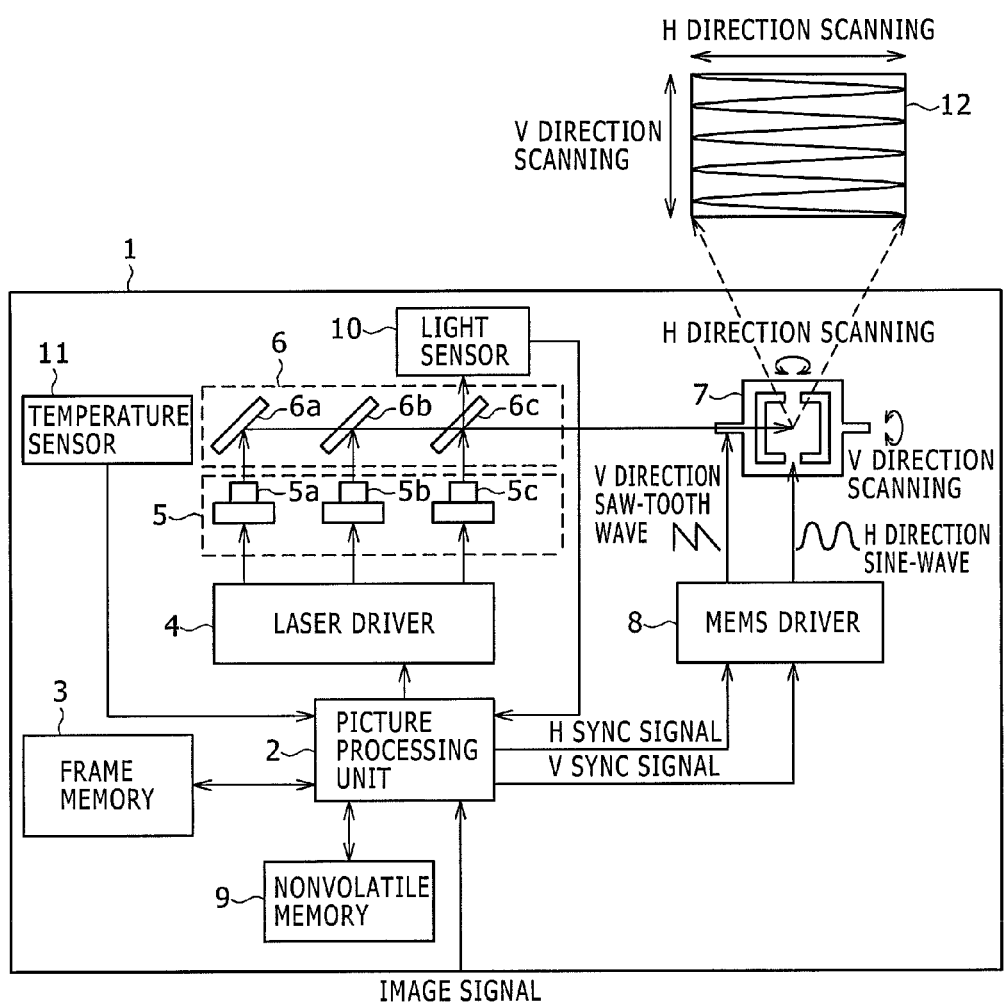
FIG. 1 is a diagram showing the fundamental configuration of a laser projection display device according to the present invention.

Hereinafter, the embodiments of the present invention will be described in detail with reference to the accompanying drawings. First, the entire configuration of a laser projection display device and the output characteristic of a laser diode will be described using FIG. 1 to FIG. 4. FIG. 1 is a diagram showing the entire configuration of the laser projection display device according to the present invention. The laser projection display device 1 includes: a picture processing unit 2; a frame memory 3; a laser driver 4; a laser light source 5; a reflecting mirror 6; a MEMS scanning mirror 7; a MEMS driver 8; a nonvolatile memory 9; a light sensor 10; a temperature sensor 11; and a display picture 12.

The picture processing unit 2 performs various corrections on an image signal input from outside and generates a picture signal, and further generates a horizontal synchronization signal and a vertical synchronization signal both of which are in synchronization with the picture signal. In addition, the picture processing unit 2 detects an image attribute amount on the basis of image information input from outside. In other words, the picture processing unit 2 has a function of judging a so-called scene change. In addition, the picture processing unit 2 controls the laser driver 4 in accordance with information obtained from the light sensor 10 and the temperature sensor 11, and adjusts the laser output so that the white balance is kept constant. The detailed description of the picture processing unit 2 will be described later.

The above-mentioned various corrections includes the correction of picture distortion owing to the scanning of the MEMS scanning mirror 7 and the gamma adjustment of a picture. Specifically, the picture distortion is induced owing to the inaccuracy of the relative angle between the projector unit 1 and the projection surface, the misalignment of the light axis of the laser light source 5 and the light axis of the MEMS mirror 7, and the like.

The laser driver 4 receives a picture signal output from the picture processing unit 2, and modulates the light emitted from the laser light source 5 in accordance with the received picture signal. The laser light source 5 includes three laser diodes (5a, 5b, and 5c) for R, G, and B primary colors, for example, and emits R, G, and B laser lights that respectively correspond to R, G, and B components of the picture signal.

The reflecting mirror 6 synthesizes one laser light using three laser lights, that is, R, G, and B laser lights, and the synthesized light is irradiated onto the MEMS mirror 7. The reflecting mirror 6 is equipped with special optical elements each of which reflects a light of a specific wavelength and lets other lights to pass through each optical element itself. These optical elements are generally called dichroic mirrors.

Specifically, the reflecting mirror 6 includes a dichroic mirror 6a that reflects a laser light (for example, R light) emitted by a laser diode 5a and lets laser lights of other colors to pass through the reflecting mirror 6a itself, a dichroic mirror 6b that reflects a laser light (for example, G light) emitted by a laser diode 5b and lets laser lights of other colors to pass through the reflecting mirror 6b itself, and a dichroic mirror 6c that reflects a laser light (for example, B light) emitted by a laser diode 5c and lets laser lights of other colors to pass through the reflecting mirror 6c itself, and synthesizes one laser light using the laser lights of R, G, and B primary colors.

The MEMS scanning mirror 7 has a biaxially-rotating mechanism, and can vibrate the central mirror portion biaxially in the horizontal and vertical directions. The MEMS driver 8 controls the vibration of the MEMS scanning mirror 7. The MEMS driver 8 generates a sine-wave in synchronization with the horizontal synchronization signal sent from the picture processing unit 2, generates a saw-tooth wave in synchronization with the horizontal synchronization signal sent from the picture processing unit 2, and drives the MEMS scanning mirror 7.

On receiving the sine-wave drive signal from the MEMS driver 8, the MEMS scanning mirror 7 performs a sine-wave resonance motion in the horizontal direction. At the same time, on receiving the saw-tooth drive signal from the MEMS driver 8, the MEMS scanning mirror 7 performs a uniform motion toward one side in the vertical direction. Through the above motions of the MEMS scanning mirror 7, the laser light is scanned with such a trajectory as shown in the display picture 12 in FIG. 1. This scanning is synchronized with the modulation operation performed by the laser driver 4, with the result that the input picture is projected. Subsequently, the light sensor 10 measures the light amount of the projected laser light, and sends the measurement result to the picture processing unit 2. In FIG. 1, the light sensor 10 is disposed so as to detect the leakage lights leaking from the R, G, and B lights that are used by the reflecting mirror 6 for synthesizing the one laser light. In other words, the light sensor 10 is disposed on the opposite side of the laser diode 5c about the reflecting mirror 6c. The reflecting mirror 6c lets the laser lights of the laser diodes 5a and 5b to pass through the reflecting mirror 6c itself, and reflects the laser light of the laser diode 5c, but the reflecting mirror 6c cannot let 100 percent of each of the laser lights of the laser diodes 5a and 5b to pass through the reflecting mirror 6c itself, and cannot reflect 100 percent of the laser light of the laser diode 5c. Generally, the reflecting mirror 6c reflects a few percent of each of the laser lights of the laser diodes 5a and 5b, and lets a few percent of the laser light of the laser diode 5c to pass through the reflecting mirror 6c itself. Therefore, in the case where the light sensor is disposed in the position shown in FIG. 1, a few percent of the laser light of the laser diode 5c is not reflected by the reflecting mirror 6c, and a few percent of the laser light of the laser diode 5a and a few percent of the laser light of the laser diode 5b are reflected by the reflecting mirror 6c, which enables small parts of the laser lights of the laser diodes 5a, 5b, and 5c to be incident on the light sensor 10.

In addition, in order to obtain temperature information about the laser light source 5, the temperature sensor 11 is disposed in the vicinity of the laser light source 5. Although it is conceivable that temperature sensors are disposed near to the laser diodes 5a, 5b, and 5c on a one-to-one basis, one temperature sensor disposed in the vicinity of the laser light source 5 will be sufficiently useful. The temperature sensor 11 measures the ambient temperature surrounding the laser light source 5, and sends the measurement result to the picture processing unit 2.

Figure 2:
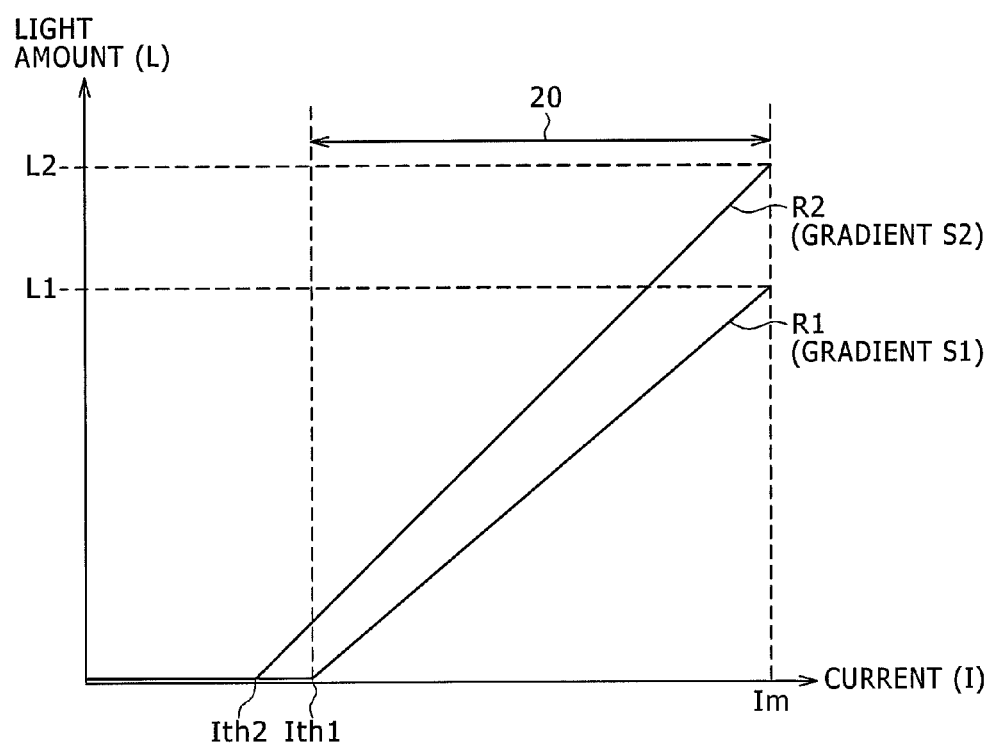
FIG. 2 is a diagram showing an example of the forward current vs. light amount characteristic of a laser diode.
Figure 3A:
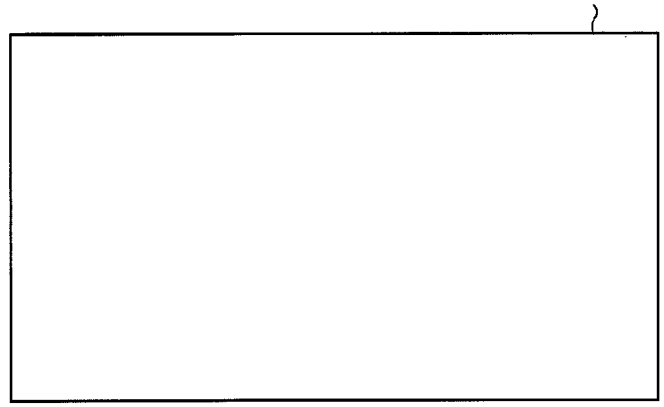
FIG. 3A to FIG. 3C are diagrams for explaining the change of color balance due to display pictures.
Figure 3B:
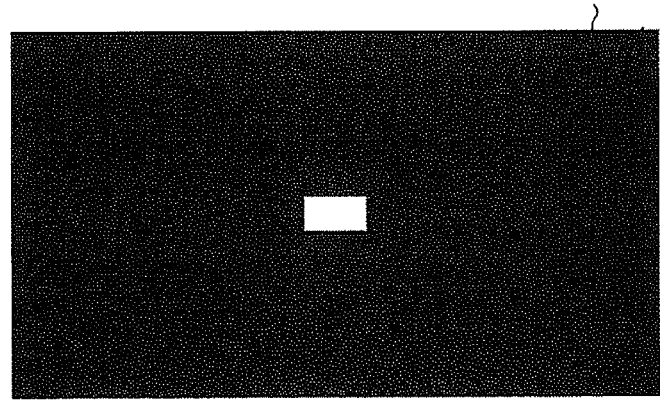
Figure 3C:
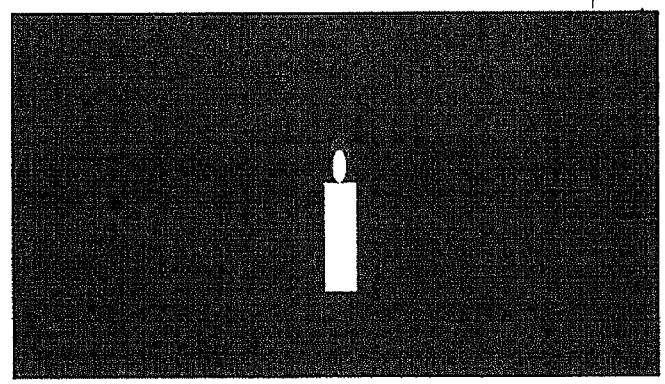
Figure 4:
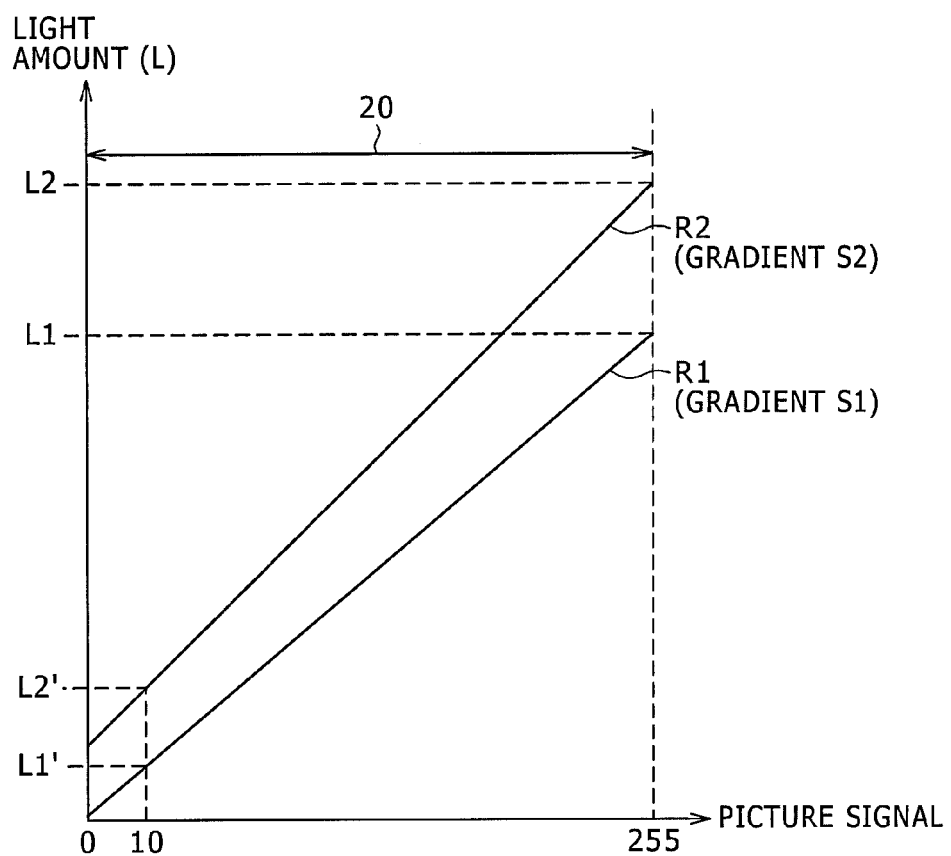
FIG. 4 is a diagram showing an example of the picture signal vs. light amount characteristic of a laser diode.

Next, the output state of the laser light amount to be projected will be explained with reference to FIG. 2 to FIG. 4. FIG. 2 is a diagram showing the forward current vs. light amount characteristic of a laser diode. Generally speaking, a laser diode has a temperature characteristic as shown in FIG. 2. As the temperature of the laser diode rises, the threshold current necessary for starting the light emission of the laser diode becomes large (from Ith2 to Ith1 as shown in FIG. 2), and the gradient of the light amount vs. the drive current becomes small (from S2 to S1 as shown in FIG. 2). Therefore, in the case where the laser light source includes three laser diodes for R, G, and B lights as shown in FIG. 1, if the drive currents vs. variations of gradients of the light amounts characteristics for R, G, and B lights with threshold currents as parameters are different from each other, there is a possibility that the white balance is changed in accordance with the magnitude of a picture signal.

The effect of the temperature characteristic of a laser diode becomes conspicuous if the accumulated drive amount of the laser diode is large. In other words, if the state where the output amount of the laser diode is large continues for a long time, the effect of the temperature characteristic of a laser diode becomes conspicuous. In this embodiment, the drive amount for the output light amount of a laser diode is referred to as a load, and if the accumulated drive amount for the laser diode is large, it is said that the laser diode is in a high load state, and if the accumulated drive amount for the laser diode is small, it is said that the laser diode is in a low load state.

Next, the relation between a picture signal and a light amount shown in FIG. 4 will be explained. Hereinafter, the following descriptions will be made taking R1 state mentioned above in FIG. 2 as a reference state. It is desirable that an effective current region 20 used for picture formation shown in FIG. 3A to FIG. 3C is a region from the threshold current Ith1 to the maximum current Im in terms of the forward current. In other words, in the case where the picture signal is represented by an 8-bit number (maximum number is 255), a forward current Ith1 corresponds to the picture signal 0 or 1, and the maximum forward current Im corresponds to the picture signal 255. One of the current values that are obtained by equally dividing the forward current width between Ith1 to 1 mA is assigned to the picture signal between the picture signal 0 or 1 and the picture signal 255, which enables the gradation of the picture to be smoothly displayed.

In the case of the picture signal 0, it is conceivable that the laser light is turned off by setting the corresponding forward current to 0 to realize the corresponding contrast. A diagram shown in FIG. 4 can be obtained by changing the variable of the horizontal axis "current" to the variable "picture signal".

FIG. 3A to FIG. 3C are diagrams for explaining the states of projected pictures displayed by the laser projection display device according to the present invention. FIG. 3A is a diagram showing a projection picture displayed by the laser projection display device in the case where a full-screen white picture (the picture signal 255) is input into the laser projection display device. It will be assumed that this state of the laser output is referred to as R1 state.

When the picture shown in FIG. 3A is abruptly switched to a picture that has a full white area of one percent in a full black background shown in FIG. 3B, the load of the laser diode becomes small because of the decrease of the white display area. The output characteristic of the laser diode transfers to R2 state that is a lower load state. At this time, the light amount of the full white area shown in FIG. 3B is changed from L1 to L2 as shown in FIG. 4.

If the light amount changes for R, G, and B lights vs. the load variation are different from each other, the white balance of the full white area also changes when the picture shown in FIG. 3A is switched to the picture shown in FIG. 3B.

When the picture shown in FIG. 3A is abruptly switched to a picture including a bright object in a low gradation background (for example, the picture signal 10) shown in FIG. 3C, the load of the laser diode becomes small because of the decrease of the white display area. The output characteristic of the laser diode transfers to R2 state that is a low load state. In this case, the light amount of the low gradation background shown in FIG. 3C is changed from L1' to L2' shown in FIG. 4, and therefore the low gradation background is unnecessarily brightly displayed. Because the sensitivity of the human eye toward a low gradation picture is higher than that toward a high gradation picture, the above change of the light amount of the low gradation background gives uncomfortable feeling to a user.

As described above, an abrupt load variation in the case of a picture switching brings about a harmful effect in that the change of the white balance of the picture and the unnecessarily bright display of the low gradation part of the picture gives uncomfortable feeling to a user. In the present invention, the image attribute of a picture signal is detected, and the light amount output characteristic and the output change of a laser light source are controlled in accordance with the attribute amount, with the result that the degradation of picture quality can be prevented. Hereinafter, the detailed description of the present invention will be made using some embodiments of the present invention.

The phenomena described above occur in accordance with the temperature characteristic of the laser output of a laser diode, and therefore, if the temperature detection is performed at the level and detection speed that have effects on the output characteristic of the laser diode, the light amount output characteristic of a laser light source including such a laser diode can be controlled.

First Embodiment

Figure 5:
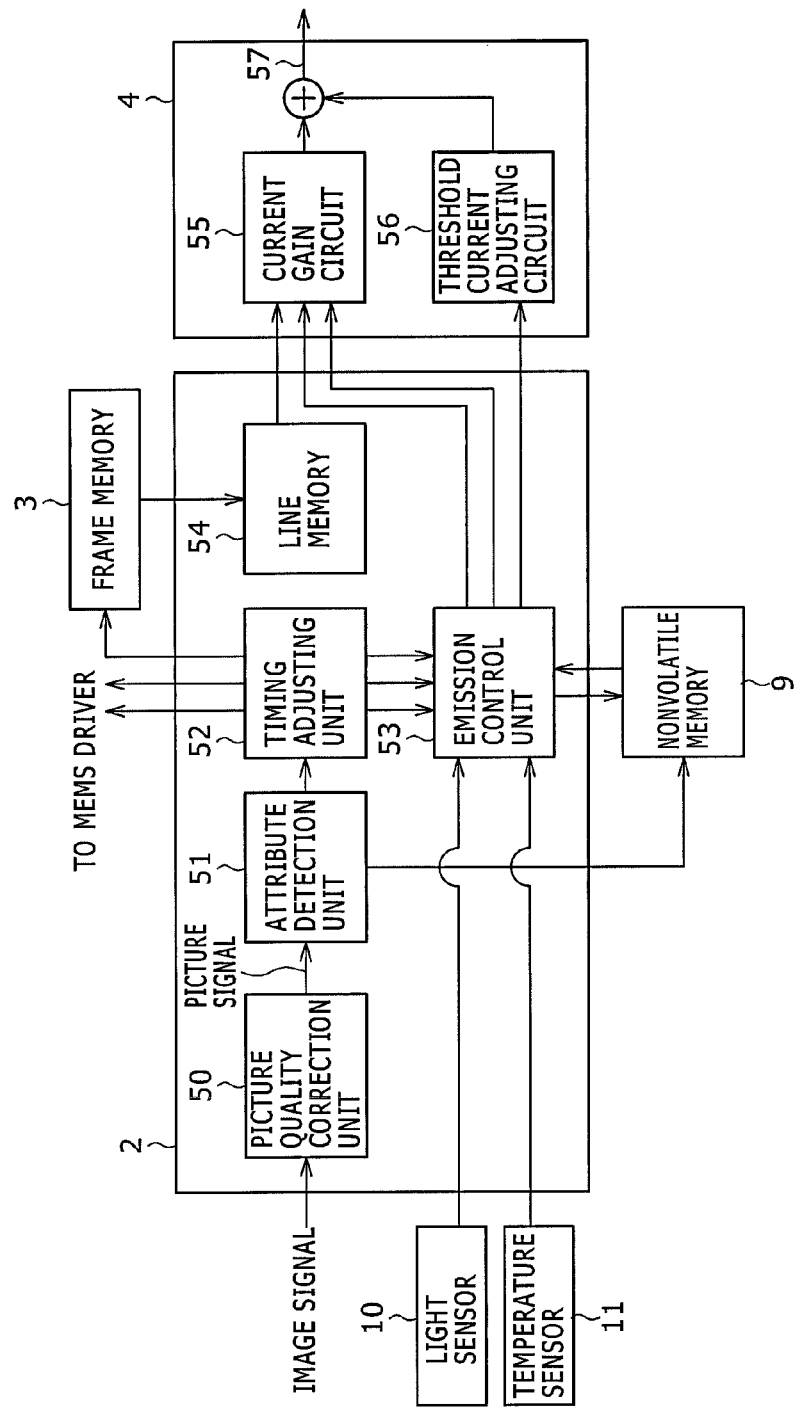
FIG. 5 is a diagram for explaining the configuration of a first embodiment of the present invention.

A first embodiment of the present invention will be described with reference to FIG. 5 to FIG. 13. FIG. 5 is a diagram showing the internal configurations of the picture processing unit 2 and the laser driver 4 in detail. An image signal input into the picture processing unit 2 from outside is sent to a picture correction unit 50. The picture correction unit performs general picture quality correction processing including the correction for the picture distortion owing to the scanning of the MEMS scanning mirror 7 and the gamma adjustment for the picture, and sends the picture signal to an attribute detection unit 51.

The attribute detection unit 51 detects picture an attribute amount including APLs, histograms, hues, the histograms and hues of plural areas into which the picture is divided and the like. In this embodiment, because the APLs that show average picture luminances of a frame for respective colors correspond to the loads of the above laser diode for the respective colors, these APLs play important roles. In addition, the later-described ACLs (average current levels) that show the load amounts of the respective colors per frame are calculated using the APLs. The attribute detection unit 51 sends the picture signal to a timing adjusting unit 52, and at the same time, writes the obtained picture attribute amount in a nonvolatile memory 9.

In addition, the attribute detection unit 51 can detect the moment when the content of the picture drastically changes on the basis of the picture attribute amount, that is, a so-called scene change although the detail of this function of the attribute detection unit 51 will be described later.

Although FIG. 5 shows the configuration of the picture processing unit 2 in which the attribute detection unit 51 is disposed after the picture quality correction unit 50 as an example, another configuration is also conceivable in which the picture quality correction unit 50 is disposed after the attribute detection unit 51.

The timing adjusting unit 52 generates a horizontal ("horizontal" will be written as "H" for short hereinafter) synchronization signal and a vertical ("vertical" will be written as "V" for short hereinafter) synchronization signal using the picture signal input from the attribute detection unit 51, and sends the two synchronization signals to a MEMS driver 8 and an emission control unit 53. In addition, the picture signal is sent to the emission control unit 53, and at the same time, it is temporarily stored in a frame memory 3. The picture signal stored in the frame memory 3 is read out by a read-out signal that is in synchronization with the H and V synchronization signals generated by the timing adjusting unit 52. In addition, the picture signal stored in the frame memory 3 is read out one frame behind the input image signal. The detailed operation of the emission control unit 53 will be described later with reference to FIG. 6 to FIG. 8.

The read-out picture signal is input into a line memory 54. The line memory 54 first brings in a part of the picture signal for one horizontal scanning interval, and reads out the successive parts of the picture signals sequentially for the following horizontal scanning intervals. The reason why the parts of the picture signal for respective horizontal scanning intervals are relayed by the line memory 54 is that, because generally there is a case where the read-out frequency of the frame memory 3 and a clock frequency used for sending the picture signal to the laser driver 4 are different from each other, it is necessary that the line memory 54 first brings in a part of the picture signal for one horizontal scanning interval using the read-out frequency of the frame memory 3, and then the successive parts of the picture signal for the following horizontal scanning intervals are read out from the line memory 54 using the transmission frequency of the picture signal. Therefore, if the read-out frequency of the frame memory 3 and the transmission frequency of the picture signal coincide with each other, the line memory 54 does not need to be installed. The picture signal read out from the line memory 54 is sent to the laser driver 4.

Next, a current gain circuit 55 and a threshold current adjusting circuit 56 included in the laser driver 4 will be explained. The threshold current adjusting circuit 56 controls a threshold current that is needed for the laser light source 5 to emit laser light in accordance with a threshold current value set by the emission control unit 53. In addition, the current gain circuit 55 controls the value of a current flowing through the laser light source 5 by multiplying the picture signal input from the line memory 54 or the emission control unit 53 by a current gain that converts the picture signal value set by the emission control unit 53 into a current value. In other words, increasing or decreasing the current gain leads to increasing or decreasing the current value corresponding to the picture signal, with the result that the gradients of the graphs shown in FIG. 4 are controlled. Therefore, an actual current value 57 is the sum of the threshold current set by the threshold current adjusting circuit 56 and a current value in accordance with the current gain set by the current gain circuit 55 and the picture signal value.

It is the fundamental operation of the picture processing unit 2 that has been described above, and hereinafter a concrete example of the operation of the picture processing unit 2 that prevents the white balance from varying owing to a temperature change and an abrupt load change will be described by emphasizing a focus on the operation of the emission control unit 53.

Figure 6:
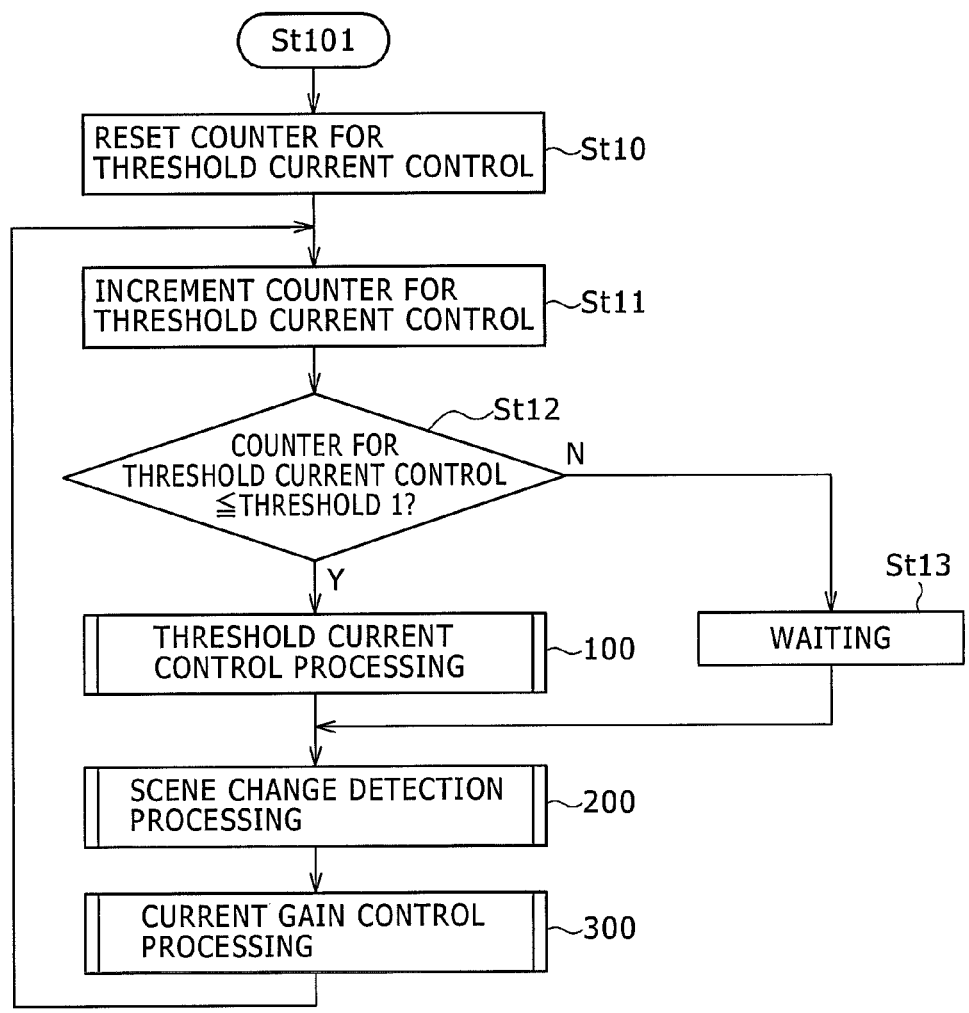
FIG. 6 is a flowchart for explaining the entire processing of the first embodiment of the present invention.

FIG. 6 is a flowchart for explaining the entire operation of the this embodiment of the present invention. The emission control unit 53 resets a counter for threshold current control after the power supply is turned on (at Step St10). Next, the emission control unit 53 increments the counter for threshold current control (at Step St11), and compares the value of the counter for threshold current control with the threshold 1 at Step St12. The counter for threshold current control is a counter used for judging whether it is necessary to perform threshold current control processing 100 or not, and it is a finite-bit counter. In other words, if the counter for threshold current control is a 8-bit counter, the counter value of the counter for threshold current control is reset to zero by the next frame in the case where the counter value of the counter is 255.

Therefore, the ratio of the frames in which the threshold current control processing 100 is performed can be set depending on the value of the threshold 1. At Step St12, if the counter value of the counter of the threshold current control processing 100 is performed, otherwise threshold current control is equal to or less than the threshold 1, the emission control unit 53 waits for one frame interval (at Step St13). After the threshold current control processing 100 or the waiting at Step St13, scene change detection processing 200 and current gain control processing 300 are performed, and afterward the flow gets back to Step St11. Pieces of processing performed from Step St11 to the next Step St11 are performed during one frame interval, and this flowchart continues until the power supply is tuned off.

Figure 7:
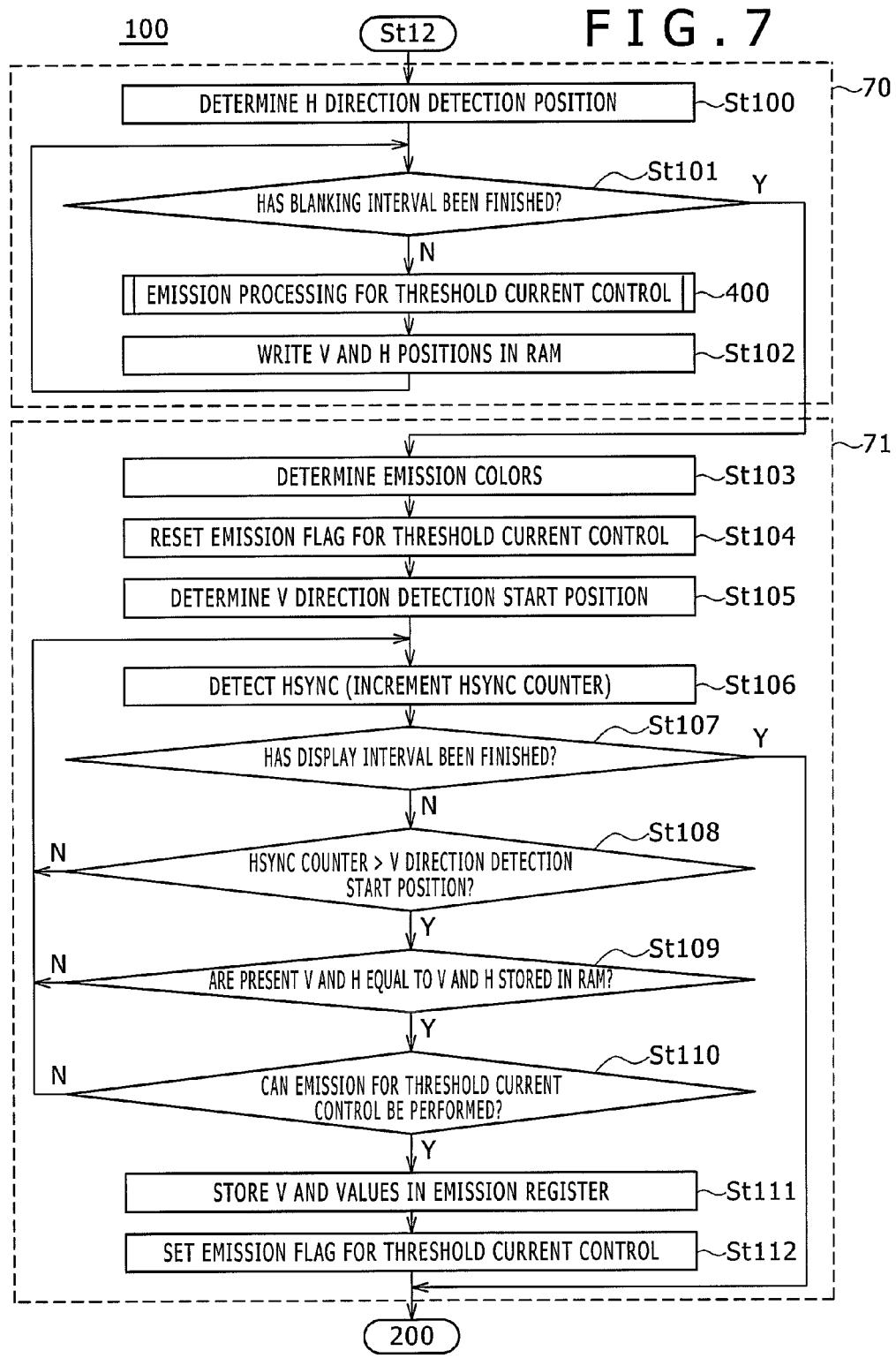
FIG. 7 is a flowchart showing the operation of threshold current control processing of the first embodiment.
Figure 8:
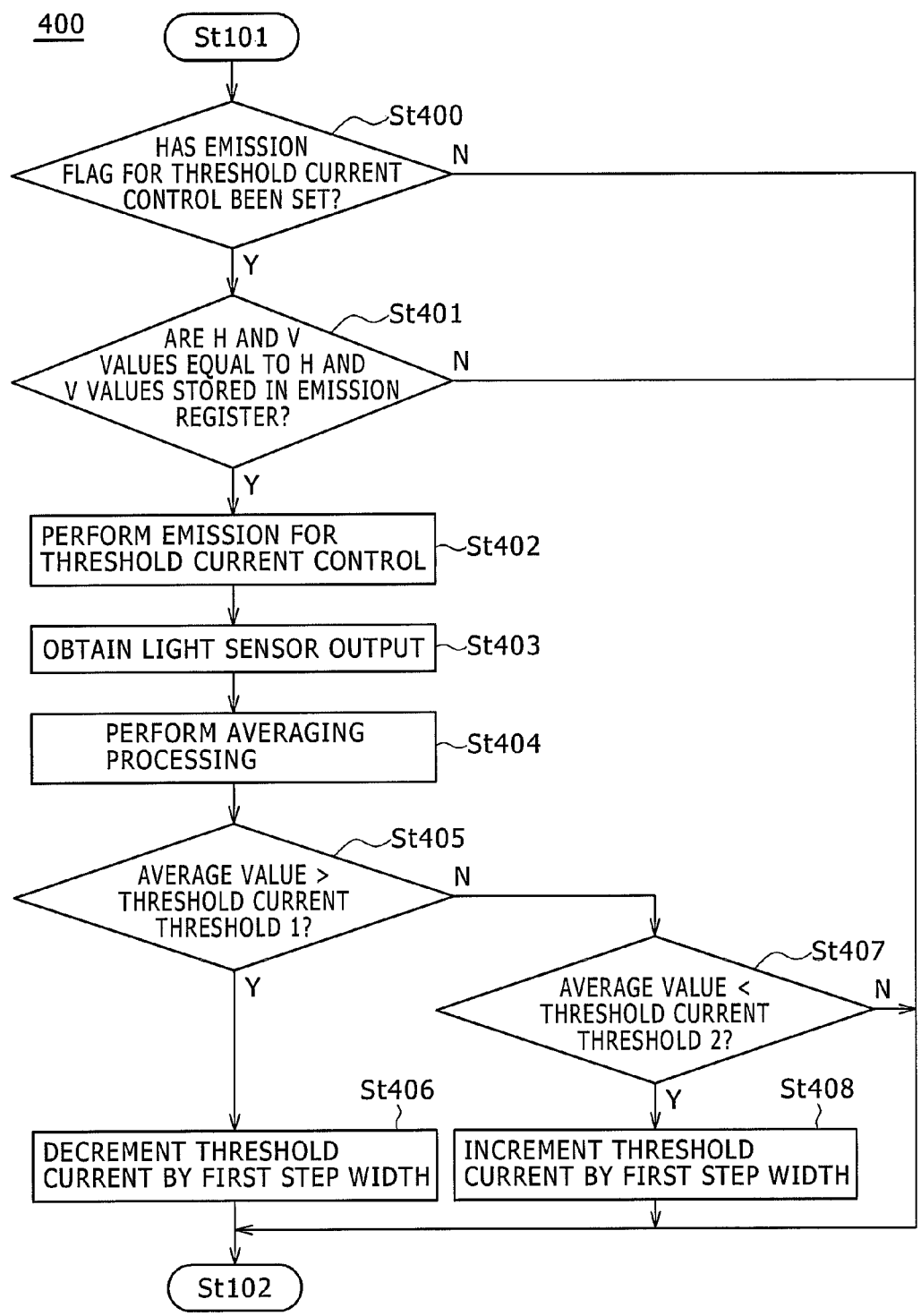
FIG. 8 is a flowchart showing the operation of emission processing for threshold current control of the first embodiment.

Next, the operation of the threshold current control processing 100 will be explained with reference to FIG. 7 to FIG. 9. FIG. 7 is a diagram showing a flowchart of the threshold current control processing 100 shown in FIG. 6. The threshold current control processing 100 starts from processing during blanking interval 70, and first determines an H direction detection position in which, emission for threshold current control is performed (at Step St100). This determination of the H direction detection position is performed so that the display position in which the emission for threshold current control is performed is disposed at a random place per frame lest a user should visually recognize the emission for threshold current control.

Next at Step St101, it is judged whether the blanking interval has been finished or not, and if the blanking interval has not been finished, the emission processing for threshold current control 400 is performed. After the emission processing for threshold current control 400, a V position and an H position are temporarily stored in a storage area that is not shown (for example, a RAM) at Step St102. Here, the H position at Step St102 means the H direction detection position determined at Step St100. By storing the V and H position as mentioned above, position information used for the scanning performed by the MEMS can be held. This series of processing is repeated until it is judged that the blanking interval has been finished at Step St101.

Here, the reason why the position information used for the scanning performed by the MEMS has to be obtained will be explained. The reason is that, because generally the drive waveform of the MEMS during the display interval and the drive waveform of the MEMS during the blanking interval are different from each other, the scanning trajectory during the display interval and the scanning trajectory during the blanking interval are different from each other. In addition, the detection method of the V and H position can be either a method in which the V and H positions are derived from an LUT (look-up table) that is not shown using the H and V synchronization signals sent from the timing adjusting unit 52, or a method in which the V and H positions are obtained from the position information of the MEMS that is typically provided.

If it is judged that the blanking interval has been finished at Step St101, the flow proceeds to processing during display interval 71. In the processing during display interval 71, an emission color (RGB color or W color) that is emitted during the next blanking interval is determined (at Step St103). If W color is emitted, the light sensor 10 has to be a type of a sensor that is capable of obtaining the light amounts of R, G, and B color components all at once. If the light sensor is a type of a sensor that cannot obtain the light amounts of R, B, and B color components all at once, it is preferable that R, G, B color components are emitted alternately on a frame-by-frame basis. In addition, in the case where the later-mentioned emission flag for threshold current control is not set, it is conceivable that processing in which the emission color is not changed is added to this threshold current control processing.

After the emission flag for threshold current control that shows whether the emission for threshold current control can be performed or not is reset (at Step St104), a V direction detection start position is determined (at Step St105). As is the case with the H direction detection position, it is desirable that the V direction detection start position is disposed at a random place per frame lest a user should visually recognize the emission for threshold current control.

After the determination of the V direction detection start position, a horizontal synchronization signal (HSYNC) is detected (at Step S106), and an HSYNC counter is incremented. Next at Step St107, it is judged whether the display interval has been finished or not, and if the display interval has not been finished, the flow proceeds to Step St108. At Step St108, the V direction detection start position determined at Step St105 is compared with the counter value of the HSYNC counter incremented at Step St106. The flow proceeds to Step St109 if the counter value of the HSYNC counter is larger than the V direction detection start position; otherwise, the flow gets back to Step St106.

At Step St109, it is judged in one horizontal scanning interval whether the scanning position information of the MEMS during the blanking interval obtained at Step St102 and the scanning position information of the MEMS during the present display interval are equal to each other or not, and if they are equal to each other, the flow proceeds to Step St110, otherwise the flow gets back to Step St106. At Step St110, it is judged whether the emission for threshold current control can be performed or not.

Here, explanation will be made about the judgment whether the emission for threshold current control can be performed or not. The emission for threshold current control is an emission that has a low light amount value (referred to as a first light amount value, hereinafter) emitted by a low gradation signal (referred to as a first reference signal level, hereinafter) such as D1 shown in FIG. 9. In this case, if the relation between the picture signal and the light amount is R1 state in FIG. 9, the light amount LL1 is obtained. Therefore, if the first reference signal level D1 is sufficiently small compared with a picture signal displayed during the display interval, a user does not visually recognize the emission for threshold current control. In addition, setting of the position of the emission for threshold current control at a random place can reduce a possibility that a user visually recognize the emission for threshold current control.

Here, the judgment whether the emission for threshold current control can be performed or not is made by obtaining a picture signal value at a picture position where the scanning position information of the MEMS during the blanking interval is equal to the scanning position information of the MEMS during the present display interval. The picture signal value is obtained in the following way: (1) a signal value of the color corresponding to the emission color determined at Step St103 per pixel is obtained; (2) plural average values each of which is obtained by averaging signal values of several pixels (averaging signal values of 8 pixels or less pixels is desirable) is calculated; and (3) the picture signal value is set to a collection of the plural average signal values. In this case, it is desirable that the minimum value of the plural average signal values in the picture position is twice the first reference signal level D1 or more.

Alternatively, because the luminances of R and G are recognized at high rates, the picture signal value is not obtained using a signal value of the color corresponding to the emission color determined at Step St103 per pixel, but the picture signal value can be obtained in the following way: (1) a sum of signal values of R and G per pixel is obtained; (2) plural average values each of which is obtained by averaging sums of signal values of several pixels (averaging sums of signal values of 8 pixels or less pixels is desirable); and (3) the picture signal value is set to a collection of the plural average signal values. And it is also desirable that the minimum value of the plural average signal values in the picture position is twice the first reference signal level D1 or more.

If the above condition is satisfied, it is judged that the emission for threshold current control can be performed at Step St110. Thanks to the above-mentioned control, in the case where, for example, the picture shown in FIG. 3B is displayed, the emission for threshold current control is not performed during the blanking interval corresponding to the full black background, with the result that the emission for threshold current control is not visually recognized by a user.

In addition, it is desirable that the value of the first reference signal D1 is a picture signal whose light amount is about one twentieth of the light amount of a picture signal that emits the maximum light amount. To put it concretely, if R1 state in FIG. 9 is taken for example, the maximum light amount L1 corresponds to the picture signal 255. Therefore, setting the value of the first reference signal D1 to a picture signal whose light amount LL1 is L1/20 (the picture signal 2 or 3) reduces a possibility that the emission for threshold current control is visually recognized by a user.

If it is judged that the emission for threshold current control can be performed at Step St110, the flow proceeds to Step Still, and the V and H positions in which the emission for threshold current control can be performed are stored in an emission register (at Step St111), and the emission flag for threshold current control is set (at Step St112). Using the values of the emission register in which the above V and H positions are stored and the emission flag for threshold current control, the emission processing for threshold current control 400 during the next blanking interval is performed. Here, if an area in which the emission for threshold current control can be performed is not included in the display interval, the flow in FIG. 7 ends on the basis of the judgment at Step St107.

Next, the operation of the emission processing for threshold current control 400 will be explained in detail with reference to FIG. 8. First in the emission processing for threshold current control 400, it is judged whether the emission flag for threshold current control was set during the previous display interval or not at Step St400, and if it was set, the flow proceeds to Step St401, otherwise the flow proceeds to Step St102.

At Step St401, it is judged whether the V and H positions during the blanking interval are equal to the V and H positions stored in the emission register at Step St111 or not. If they are equal to each other, the first reference signal level D1 of the color corresponding to the emission color determined at Step St103 is sent to the current gain circuit 55, and the emission for threshold current control is performed (at Step St402). On the other hand, the V and H positions during the blanking interval are not equal to the V and H positions stored in the emission register, the flow proceeds to Step St102. After the emission for threshold current control is performed (at Step St402), the first light amount value that is a light sensor output from the light sensor 10 is obtained (at Step St403), and averaging processing is performed (at Step St404).

This averaging processing (at Step St404) is performed in such a way that the first light amount value obtained at Step St403 is stored in a storage area (not shown), and then this first light amount value and first light amount values of the previous frames are used to calculate the average value. In the case where the first light amount values can be steadily obtained, this averaging processing can be omitted, but in order to cope with the variation of the output value of the light sensor, it is desirable to introduce this averaging processing. The first light amount value obtained by the averaging processing is compared with threshold current values threshold 1 and threshold 2 at Step St405 and Step St407 respectively.

Figure 9:
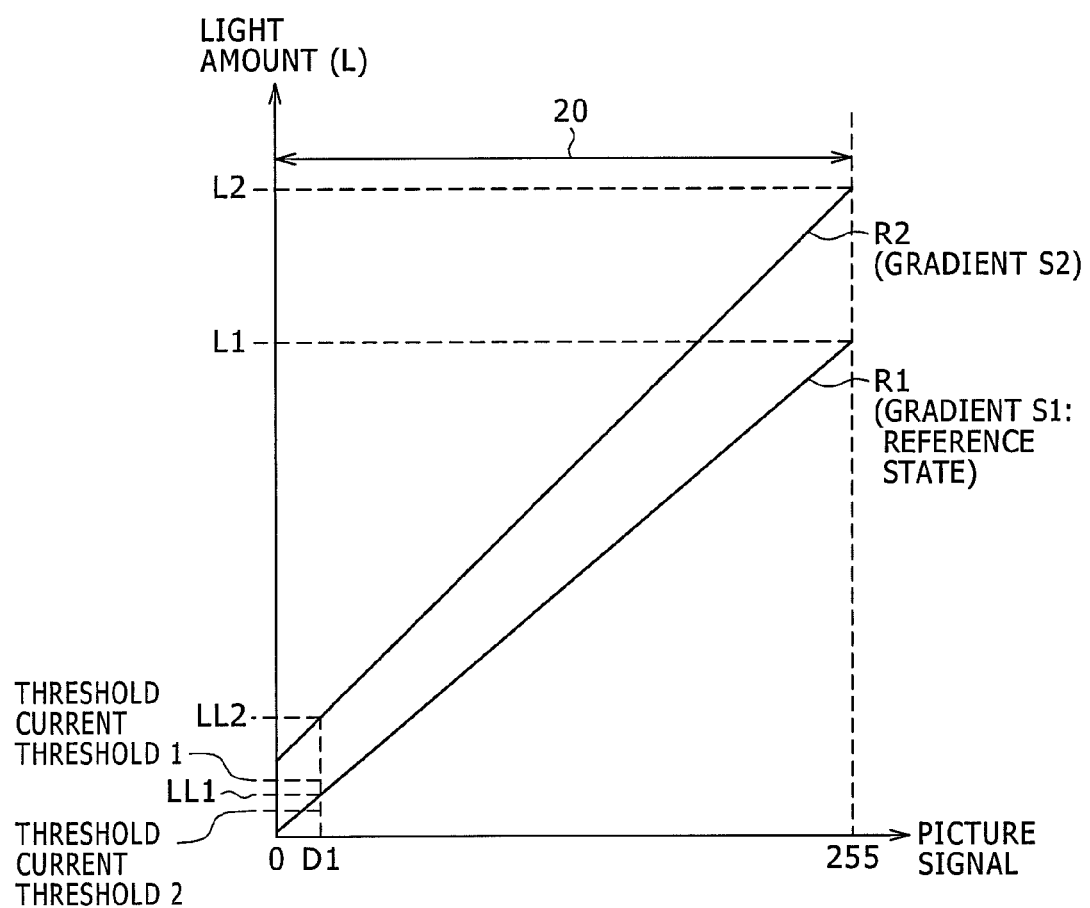
FIG. 9 is an explanation diagram showing an example of the picture signal vs. light amount of a monochromatic light source characteristic obtained in the emission processing for the threshold current control of the first embodiment.

Here, the threshold current values threshold 1 and threshold 2 are respectively the upper limit value and the lower limit value of the first light amount value as shown in FIG. 9. In other words, if the first light amount value obtained by the averaging processing is larger than the threshold current threshold 1, the first light amount value can be put close to LL1 by making the threshold current smaller. Conversely, if the first light amount value obtained by the averaging processing is smaller than the threshold current threshold 2, the first light amount value can be put close to LL1 by making the threshold current larger. In addition, if the first light amount value obtained by the averaging processing is between the threshold current thresholds 1 and 2, it is unnecessary to change the threshold current.

According to the above operation, the first light amount value obtained by the averaging processing can be kept within a certain range, with the result that the picture signal vs. light amount characteristic can be put close to the characteristic of R1 state that is the reference state. In addition, the values of LL1, the threshold currents threshold 1 and threshold 2 are determined on the basis of the reference state and the first reference signal level D1, therefore the values of LL1, the threshold currents threshold 1 and threshold 2 are usually stored in the nonvolatile memory 9 and the like.

However, the luminance of a whole screen largely changes along with large increase or large decrease in the threshold current, which makes a user visually recognize the fluctuations of the screen called flickers. Especially, if the change between the picture signals of two successive frames is small, there is a high possibility that the flickers are visually recognized. Therefore, the threshold current has to be incremented or decremented by a first step width that is a minimum step width (at Steps S406 and St408) so that the flickers generated by the increment or decrement of the threshold current are not visually recognized by the user. Therefore, the threshold current value is sent to the threshold current adjusting circuit 56 so that the threshold current is decremented by the first step width at Step St406 or incremented by the first step width at Step St408.

In addition, it should be noted that, because the processing during display interval is performed by the emission control unit 53 in FIG. 5, the processing is performed on the picture signal that is written in the frame memory 3. In other words, the picture signal written in the frame memory 3 is behind the picture signal, which is to be displayed and stored in the line memory 54, by one frame. Therefore, the display picture, on which whether a piece of emission processing for threshold current control 400 can be performed or not is judged, is displayed in the next display interval after the piece of emission processing for threshold current control 400 is performed.

In this case, it is conceivable that, by delaying the performance of the piece of emission processing for threshold current control 400 by one frame while information is being held as it is, the piece of the emission processing for threshold current control 400 is performed in the next blanking interval after the display interval of the display picture on which whether the piece of emission processing for threshold current control 400 can be performed or not is judged. In other words, although the flowchart of the threshold current control processing 100 starts at the blanking interval start position, it is conceivable that the flowchart starts at the display interval start position by replacing the processing during blanking interval 70 by the processing during display interval 71.

In addition, although the descriptions of this embodiment have been made under the assumption that the emission for threshold current control is performed once per frame, it goes without saying that it is all right to perform plural pieces of emission for threshold current control at different picture positions in one frame by repeating Step St110 at which whether the emission for threshold current control can be performed or not is judged and the following Steps plural times.

Figure 10:
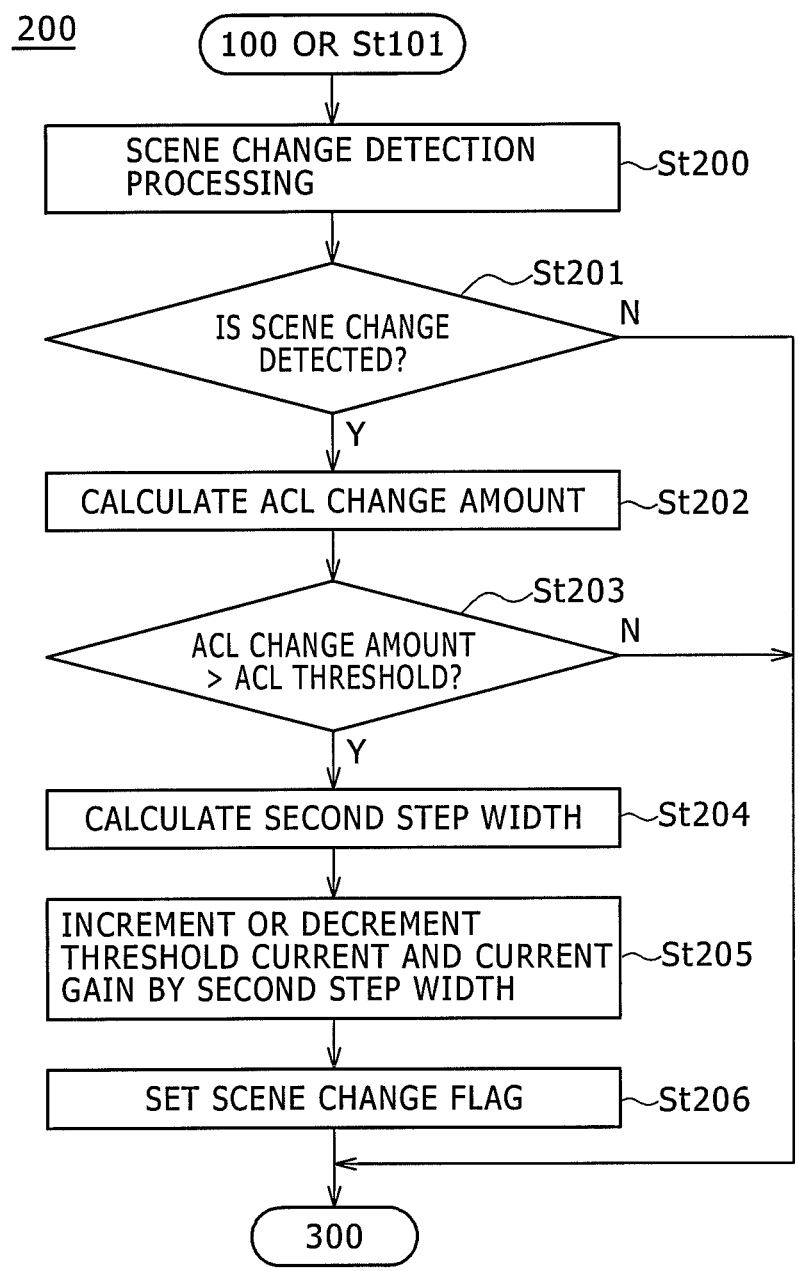
FIG. 10 is a flowchart showing the operation of scene change detection processing of the first embodiment.

Next, the scene change detection processing 200 will be explained with the reference to FIG. 10 and FIG. 11. In the scene change detection processing at Step St200, various picture attribute amounts, which are obtained by the attribute detection unit 51 and stored in the nonvolatile memory 9, for at least two frames are read out, and the variation of the attribute amount is calculated. A scene change is detected on the basis of the variation. In addition, the APLs for respective colors are read out, and ACls that show the load amounts of the respective colors per frame are calculated using the APLs.

ACL is given by the following equation:

$$ACL = (APL \times (Im - Ith) + Ith) / Imax, \quad \text{(Equation 1)}$$

where Ith and Im are respectively the threshold current value and the maximum current value corresponding to the current frame, and Imax is the upper current value the emission control unit 53 can set. In addition, Imax is determined using the rated current of the laser light source 5 or the maximum current value that the laser driver 4 can set, or Imax is a constant value that is arbitrarily set such as the maximum current value determined from a practical usage. In addition, Ith and Im can be calculated by the emission control unit 53 using the threshold current value and a current gain setting value that are sent to the threshold current adjusting circuit 56 and the current gain circuit 55. Although, explanations in the following embodiments will be made using the ACLs for respective colors, it is conceivable that similar explanations will be made using the APLs without calculating Equation 1.

At Step St200, if a scene change is detected, an ACL change amount is calculated (at Step St202), and if the scene change is not detected, the flow proceeds to the current gain control processing 300. The ACL change amount calculated at Step St202 is compared with an ACL threshold at Step St203.

Here, the ACL threshold is prepared to be used for judging whether the load amounts of respective colors per frame abruptly change or not. If, in the scene change detection processing (at Step St200), if a set of histogram variation amounts of plural areas into which a picture is divided is set to a scene change judgment standard, there is case where a scene change is detected even if the ACLs do not change. Therefore, it is necessary to judge whether the load amounts of respective colors per frame actually have changed or not at Step St203.

If the ACL change amount exceeds the ACL threshold, a second step width is calculated at Step St204. In the calculation method of the second step width, the relation between an ACL, which makes the relation between the light amount and the forward current the standard state, and the threshold current/current gain is stored in advance in the nonvolatile memory 9 and the like as an LUT as shown in FIG. 11, and by reading out the values of the threshold current and current gain from an ACL calculated at Step St200, the difference between the read-out value of the threshold current and the present set value of the threshold current, and the difference between the read-out value of the current gain and the present set value of the current gain are calculated.

Here, although it is all right that the LUT shown in FIG. 11 is a static LUT that is stored in advance, it is more preferable that the LUT is a dynamic LUT that is obtained, for example, by updating the threshold current, which is obtained from the operation result of the above-described threshold current control processing 100, as needed during the normal operation. In addition, in FIG. 11, it is preferable that each threshold current, current gains, and temperature corresponding to each ACL are stored.

At Step St205, the threshold current is sent to the threshold current adjusting circuit 56 and the current gain is sent to the current gain circuit 55 so that the threshold current and the current gain are changed by the second step width that is determined at Step St204.

At Step St206, a scene change flag showing that the threshold current and the current gain has been changed is set. The role of the scene change flag will be described in the description of the operation of the current gain control processing 300.

That is the description of the scene change detection processing 200. When a scene changes, because the entire screen of the scene is switched, the fluctuations of the screen called flickers are not visually recognized by a user. In other words, the second step width can be set to a larger value than the first step width.

The change of the threshold current and the gain current performed by the second step width is configured to be available only when a scene change is detected. With such a configuration as above, a harmful effect in that the change of the white balance of a picture or the unnecessarily bright display of the low gradation part of the picture owing to an abrupt load variation of the laser light source in the case of a picture switching gives uncomfortable feeling to a user can be suppressed.

Next, the operation of the current gain control processing 300 will be described with reference to FIG. 12 and FIG. 13. In the current gain control processing 300, first temperature information is obtained from the temperature sensor 11 (at Step St300). Next, it is judged whether the scene change flag has been set in the present frame or not at Step St301). Here, the role of the scene change flag will be explained with reference to FIG. 13.

Figure 13:
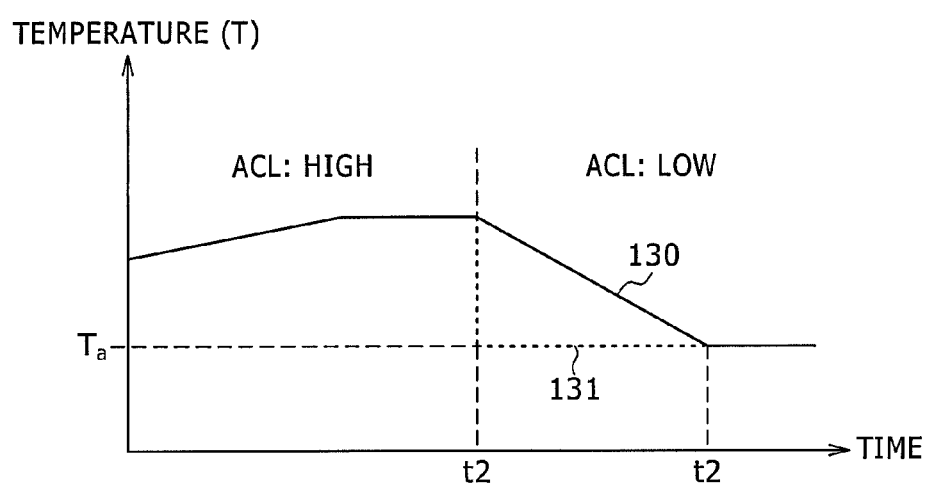
FIG. 13 is an explanation diagram showing an example of temperature information obtained by a temperature sensor of the first embodiment.

FIG. 13 is a schematic diagram that depicts the output of the temperature sensor with time on a horizontal axis and the output of the temperature sensor on a vertical axis. FIG. 13 shows that a scene change occurs at time t1, and that the displayed picture changes from a picture with a high ACL to a picture with a low ACL. It will be assumed that the temperature, which is brought about by the picture at the time t1 and later, becomes a temperature Tα. In this case, the output of the temperature sensor does not abruptly change as shown in a dotted line 131, but changes along a solid line 130 with a large time constant, and reaches the temperature Tα at the time t2.

In other words, just after an abrupt load variation, the temperature information from the temperature sensor is strongly affected by a temperature state before a scene change. Therefore, just after the scene change, the current gain should be controlled on the basis of the ACL rather than on the basis of the temperature information. The interval during which the current gain should be adjusted is shown by the scene change flag.

If it is judged that the scene change flag has been set at Step St301, an ACL value is compared with an gain threshold 1 and an gain threshold 2 respectively at Step St302 and Step St304. After an estimated ACL value is read out from the LUT shown in FIG. 11 using the current gain setting value set in the current gain circuit 55 in the present frame, the gain threshold 1 is obtained by subtracting a constant from the estimated ACL value, and the gain threshold 2 is obtained by adding the constant to the estimated ACL value.

For example, if the current gain is 0.82, and the constant is 3%, the estimated ACL 10% is read out from FIG. 11, with the result that the gain threshold 1 is 7% (=10−3), and the gain threshold 2 is 13% (=10+3). Therefore, the gain threshold 1 and the gain threshold 2 is respectively the lower limit value and the upper limit value for the ACL.

Because the fact that the ACL in the present frame is smaller than the gain threshold 1 means that the load has become smaller, the relation between the light amount and the forward current can be put close to the standard state by decreasing the current gain. Conversely, the ACL in the present frame is larger than the gain threshold 2, the relation between the light amount and the forward current can be put close to the standard state by increasing the current gain. In addition, if the ACL in the present frame is between the gain threshold 1 and the gain threshold 2, the current gain is not changed. According to the above-described procedure, the relation between the light amount and the forward current can be put close to the standard state.

However, as is the case with large increase or large decrease in the threshold current, the luminance of a whole screen largely changes along with large increase or large decrease in the current gain, which makes a user visually recognize the fluctuations of the screen called flickers. Especially, if the change between the picture signals of two successive frames is small, there is a high possibility that the flickers are visually recognized. Therefore, the current gain has to be incremented or decremented by the first step width that is a minimum step width (at Steps S303 and St305) so that the flickers generated by the increment or decrement of the current gain are not visually recognized by the user. Therefore, the current gain is sent to the current gain circuit 55 so that the current gain is decremented by the first step width at Step St303 or incremented by the first step width at Step St305.

Figure 12:
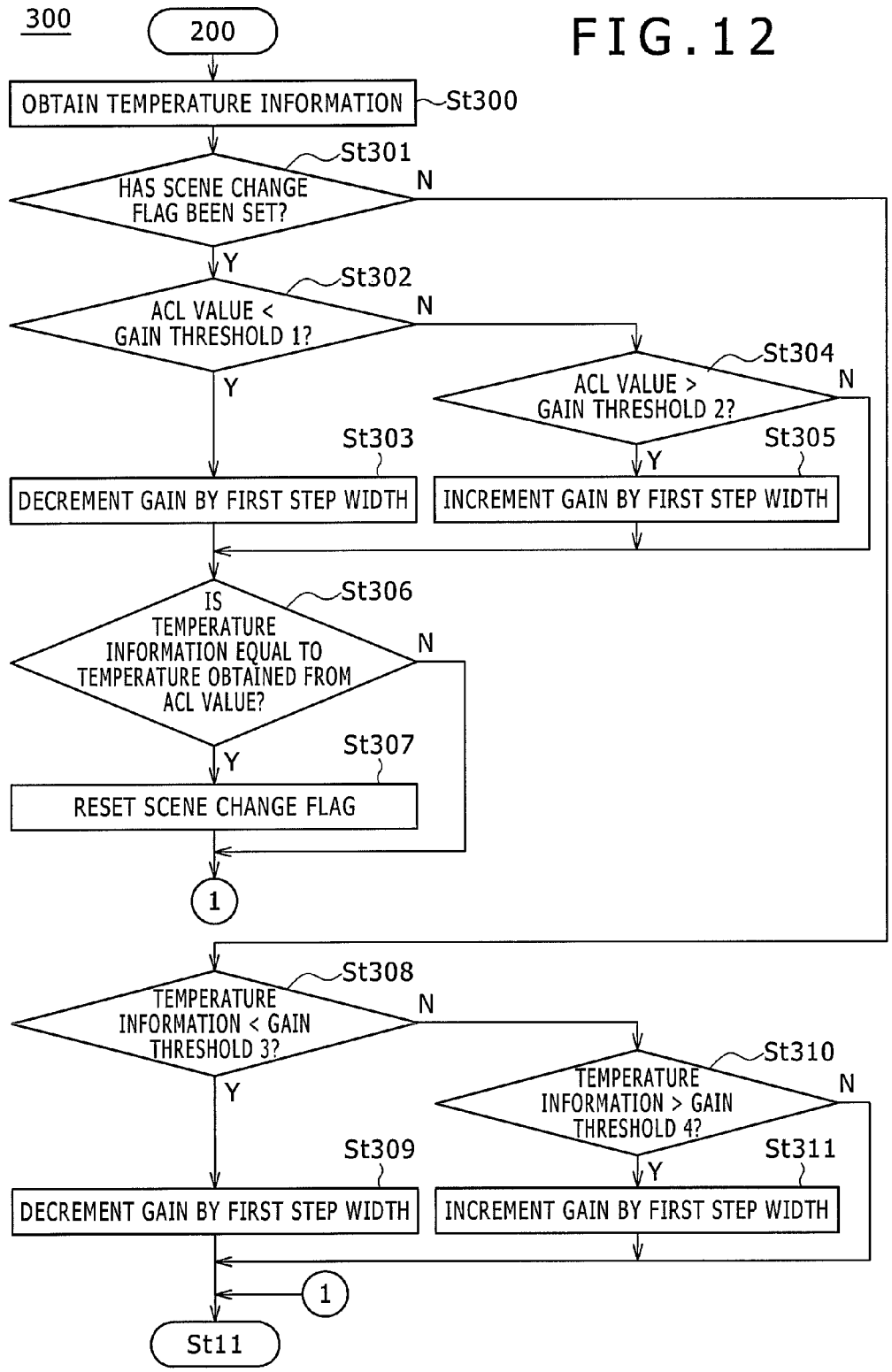
FIG. 12 is a flowchart showing the operation of current gain control processing of the first embodiment.

Next, in FIG. 12, it is judged whether the content of the temperature information is equal to the temperature obtained from the ACL value or not (at Step St306). This judgment is a judgment whether the criterion on the basis of which the current gain is controlled should be switched from the ACL to the temperature information at the time t2 in FIG. 13 or not.

In other words, at Step St306, the temperature information corresponding to the ACL is obtained from the LUT in FIG. 11, and it is judged whether the temperature information is equal to the temperature information in the present frame or not. If both information is equal to each other, the scene change flag is reset (at Step St307). With this reset of the scene change flag, the current gain is controlled not on the basis of the ACL, but on the temperature information. In addition, it is not always necessary that the temperature information in the present frame is completely equal to the temperature information corresponding to the ACL obtained from the LUT in FIG. 11 at Step St306 for the reset of the scene change flag. In other words, it is conceivable that the scene change flag is reset in the case where the temperature information in the present frame is approximately equal to the temperature information corresponding to the ACL.

If it is judged that the scene change flag has not been set at Step St301, the temperature information is compared with a gain threshold 3 at Step St308, and the temperature information is compared with a gain threshold 4 at Step St310. As for the gain threshold 3 and the gain threshold 4, after an estimated temperature information value is read out from the LUT shown in FIG. 11 using the current gain setting value set in the current gain circuit 55 in the present frame, the gain threshold 3 is obtained by subtracting a constant from the estimated temperature information value, and the gain threshold 4 is obtained by adding the constant to the estimated temperature information value.

In other words, in the case where the current gain is 0.82, and the constant is Tβ, the estimated temperature information value T3 is read out from FIG. 11, with the result that the gain threshold 3 is T3−Tβ, and the gain threshold 4 is T3+Tβ. Therefore, the gain threshold 3 and the gain threshold 4 is respectively the lower limit value and the upper limit value for the temperature information value. Because the fact that the temperature information value in the present frame is smaller than the gain threshold 3 means that the load has become smaller, the relation between the light amount and the forward current can be put close to the standard state by decreasing the current gain.

Conversely, the temperature information value in the present frame is larger than the gain threshold 4, the relation between the light amount and the forward current can be put close to the standard state by increasing the current gain. In addition, if the temperature information value in the present frame is between the gain threshold 3 and the gain threshold 4, the current gain is not changed. According to the above-described procedure, the relation between the light amount and the forward current can be put close to the standard state.

Therefore, the current gain has to be incremented or decremented by the first step width that is a minimum step width (at Steps S309 and St311) so that the flickers generated by the increment or decrement of the current gain are not visually recognized by a user. Therefore, the current gain is sent to the current gain circuit 55 so that the current gain is decremented by the first step width at Step St309 or incremented by the first step width at Step St311.

These are the descriptions of the first embodiment of the present invention with reference to the flowcharts shown in FIG. 6 to FIG. 8, FIG. 10, and FIG. 12. According to this embodiment, the picture signal vs. gradient of the light amount characteristic with a threshold current as a parameter can be kept constant when there are the change of temperature and the abrupt change of load, therefore a harmful effect in that the change of the white balance of a picture or the unnecessarily bright display of the low gradation part of the picture gives uncomfortable feeling to a user can be suppressed.

For example, in the case where the full-screen white picture shown in FIG. 3A is abruptly switched to the picture that has a full white area of one percent in a full black background shown in FIG. 3B as described above, it will be assumed that the characteristic of the laser diode transfers from R1 state to R2 state. In this case, if the second step width is not adopted in the present invention, because the characteristic of the laser diode changes slowly with time owing to the adoption of the first step width, there is a possibility that the change of the white balance can be visually recognized by a user. On the other hand, because the second step width is adopted in the present invention, the characteristic of the laser diode can be swiftly put close to R1 state, which leads to the suppression of the change of the white balance of the full-screen white area.

In addition, in the case where the picture shown in FIG. 3A is abruptly switched to the picture including the bright object in the low gradation background (for example, the picture signal 10) shown in FIG. 3C, because the second step width is adopted in the present invention, a harmful effect in that the low gradation background is unnecessarily brightly displayed can be suppressed.

Second Embodiment

In the above embodiment 1, an explanatory example in which the current gain control is performed using the temperature information obtained from the temperature sensor 11 and the ACL value in the present frame has been described. Other than the above-described control method, it is conceivable that the current gain is controlled by another type of threshold current control processing to which emission for current gain control with emission intensity different from the emission intensity needed by the above-described threshold current control processing is added. In this case, it is also possible that the picture signal vs. gradient of the light amount characteristic with a threshold current as a parameter is kept constant when there are the change of temperature and the abrupt change of load, therefore this threshold current control processing has the same advantage as the first embodiment has. In addition, this control method does not need a temperature sensor 11, which leads to the cost reduction.

Hereinafter, the configuration of an embodiment to which this emission for current gain control is added will be described as a second embodiment of the present invention with reference to FIG. 14 to FIG. 18. Here, the components of the second embodiment that have the same configurations or functions as those of the components of the first embodiment will be given the same reference numerals and the detailed descriptions regarding these components will be omitted.

Figure 14:
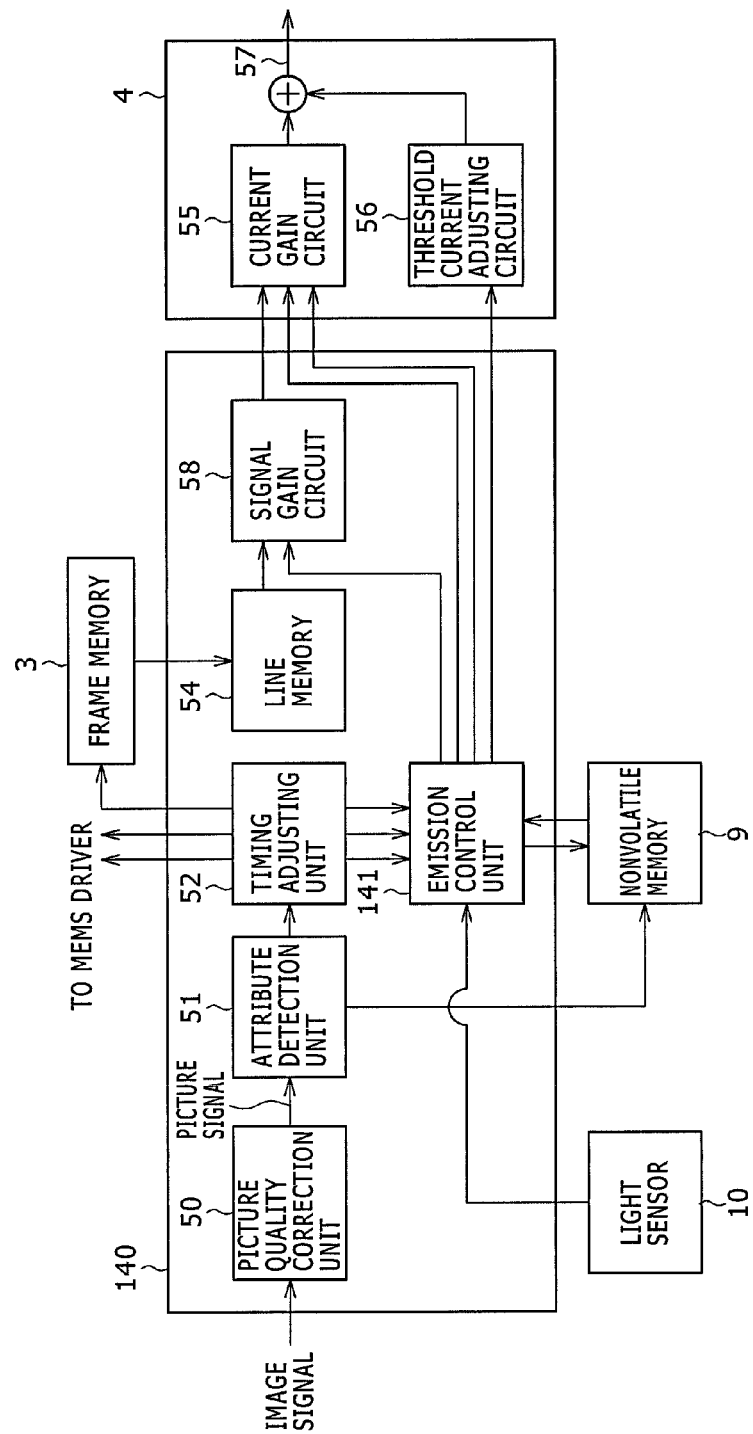
FIG. 14 is a diagram showing the internal configurations of an picture processing unit and a laser driver of a second embodiment.

FIG. 14 is a diagram showing the internal configurations of a picture processing unit 140 and a laser driver 4 of the second embodiment of the present invention. The picture processing unit 140 of the second embodiment has a configuration that is obtained by adding a signal gain circuit 58 to and deleting the temperature sensor 11 from the configuration of the picture processing unit 2 of the first embodiment, and the operation of an emission control unit 141 is different from that of the emission control unit 53 of the first embodiment. A signal gain circuit 58 multiplies a picture signal sent from a line memory 54 with a signal gain set by the emission control unit 141, and sends the calculated result to a current gain circuit 55. Hereinafter a concrete example of the operation of the picture processing unit 140 that prevents the white balance from varying owing to a temperature change and an abrupt load change will be described by emphasizing a focus on the operation of the emission control unit 141.

Figure 15:
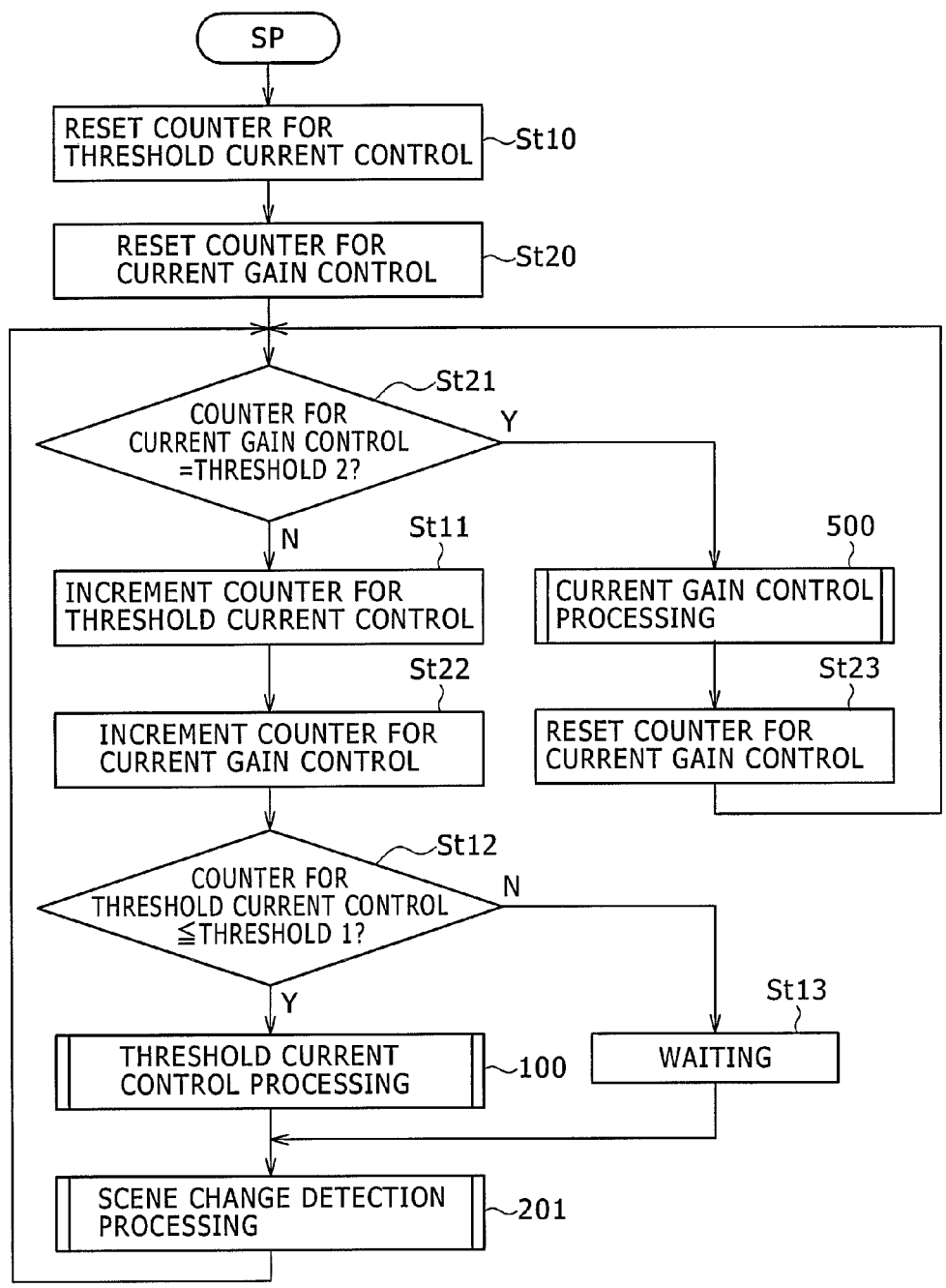
FIG. 15 is a flowchart for explaining the entire processing of the second embodiment of the present invention.

FIG. 15 is a flowchart for explaining the entire operation of the embodiment of the present invention. The emission control unit 141 resets a counter for threshold current control after the power supply is turned on (at Step St10), and subsequently resets a counter for current gain control (at Step St20). Next, the emission control unit 141 judges whether the counter value of the counter for current gain control is equal to a threshold 2 or not at Step St21. Here, the counter for current gain control is a counter used for performing current gain control processing 500 per an arbitrary number of frames. In other words, the number of frames for which the current gain control processing 500 is successively performed can be set in accordance with the threshold 2.

If it is judged that the counter value of the counter for current gain control is not equal to the threshold 2 at Step St21, the counter for threshold current control and the counter for current gain control are incremented respectively at Step St11 and Step St22. Subsequently, the counter value of the counter for threshold current control is compared with a threshold 1 at Step St12. The counter for threshold current control is a counter used for judging whether it is necessary to perform the emission for threshold current control per frame or not, and it is a finite-bit counter. In other words, if the counter for threshold current control is an 8-bit counter, the counter value of the counter for threshold current control is reset to zero in the next frame in the case where the counter value of the counter is 255. Therefore, the ratio of the frames in which the emission for threshold current control is performed can be set in accordance with the value of the threshold 1.

At Step St12, if the counter value of the counter of the threshold current control is equal to or less than the threshold 1, the threshold current control processing 100 is performed, otherwise the emission control unit 141 waits for one frame interval (at Step St13). After the threshold current control processing 100 or the waiting at Step St13, scene change detection processing 201 is performed, and afterward the flow gets back to Step St21. The scene change detection processing 201 is processing obtained by deleting the step for setting the scene flag (at Step St206) from the scene change detection processing 200 performed in the first embodiment.

If it is judged that the counter value of the counter for current gain control equal to the threshold 2 at Step St21, the flow proceeds to the later-described current gain control processing 500. In the current gain control processing 500, after the processing is successively performed for plural frames, the counter for the current gain control is reset (at Step St23), and the flow gets back to Step St21.

According to the processing shown in FIG. 15, the number of frames for which the current gain control processing 500, the threshold current control processing 100, or the waiting at Step St13 is successively performed can be modified by setting the threshold 1 and the threshold 2. In addition, it is desirable that the number of frames for which the current gain control processing 500 is successively performed is less than the number of frames for which the threshold current control processing 100 is successively performed. The reason is that the current gain control processing 500 needs the emission for current gain control with emission intensity a little stronger than the threshold current control processing 100 needs, so that it is necessary to make the number of frames for which the emission for current gain control is successively performed smaller than that for which the threshold current control processing 100 is successively performed.

Figure 16:
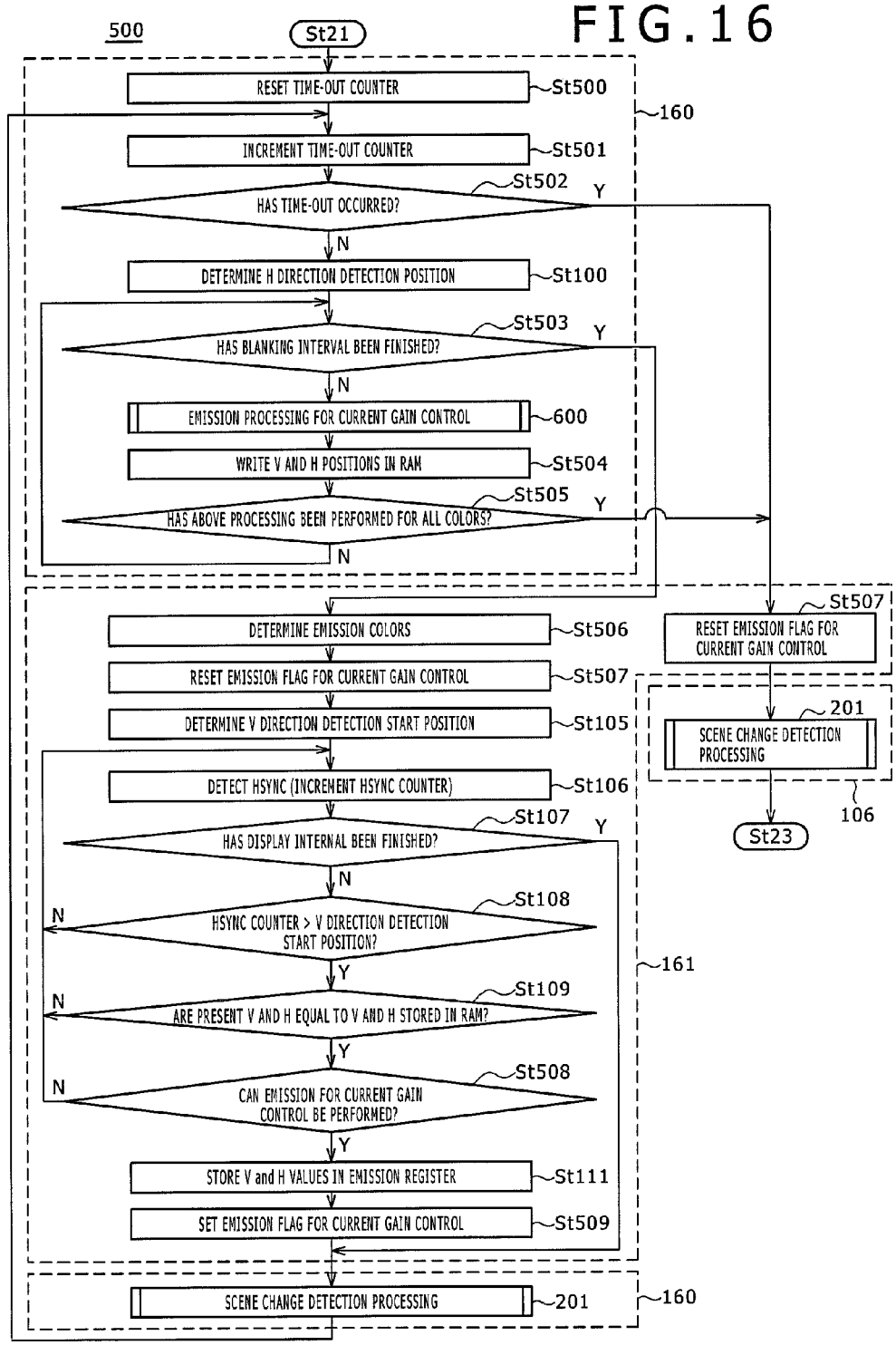
FIG. 16 is a flowchart showing the operation of current gain control processing of the second embodiment.

Next, the operation of the current gain control processing 500 will be explained with reference to FIG. 16 to FIG. 18. FIG. 16 is a diagram showing the flowchart of the current gain control processing 500 shown in FIG. 15. The current gain control processing 500 starts with processing during blanking interval 70. First, a time-out counter is reset (at Step St500). Next, after the time-out counter is incremented (at Step St501), it is judged whether time-out processing is needed or not (at Step St502). Here, the time-out counter is installed to be used for making the flow of the current gain control processing 500 end when emission processing for current gain control is not finished within a predefined time period, with the result that the execution of the threshold current control processing 100 can escape being halted.

If a time-out occurs at Step St502, after an emission flag for current gain control is reset, the scene change detection processing 201 is performed and the flow proceeds to Step St23. If the time-out does not occur at Step St502, an H direction detection position in which the emission for current gain control is performed is determined (at Step St100). As is the case with the threshold current control processing 100, this determination of the H direction detection position is performed so that the display position in which the emission for current gain control is performed is disposed at a random place per frame lest a user should visually recognize the emission for current gain control.

Next at Step St503, it is judged whether the blanking interval has been finished or not, and if the blanking interval has not been finished, the emission processing for current gain control 600 is performed. After the emission processing for current gain control 600, a V position and an H position are temporarily stored in a storage area that is not shown (for example, in a RAM) at Step St504. Here, the H position stored at Step St504 means the H direction detection position determined at Step St100.

Storing of the V and H positions as mentioned above can hold position information used for the scanning performed by the MEMS. After the V and H position is stored, it is judged whether the emission processing for current gain control 600 has been performed for all colors or not at Step St505. If it is judged that the emission processing for current gain control has not been performed for all colors at Step St505, the flow gets back to Step St503, and this series of pieces of processing is repeated until the blanking interval is finished or until it is judged that the emission processing for current gain control has been performed for all colors.

Here, the reason why the position information used for the scanning performed by the MEMS has to be obtained is that, because generally the drive waveform of the MEMS during the display interval and the drive waveform of the MEMS during the blanking interval are different from each other, the scanning trajectory during the display interval and the scanning trajectory during the blanking interval are different from each other. In addition, the detection method of the V and H positions can be either a method in which the V and H positions are derived from an LUT (look-up table) that is not shown using the H and V synchronization signals sent from a timing adjusting unit 52, or a method in which the V and H positions are obtained from the position information that is typically provided for the MEMS.

If it is judged that the blanking interval has been finished at Step St503, the flow proceeds to processing during display interval 161. In the processing during display interval 161, an emission color (RGB color or W color) that is emitted during the next blanking interval is determined (at Step St506). If W color is emitted, a light sensor 10 has to be a type of a sensor that is capable of obtaining the light amounts of R, G, and B color components all at once. If the light sensor is a type of a sensor that cannot obtain the light amounts of R, B, and B color components all at once, it is preferable that the emitted light is a monochromatic light. In the case where the later-mentioned emission flag for threshold current control is not set, it is conceivable that processing in which the emission color is not changed is added to this threshold current control processing.

After the emission flag for current gain control that shows whether the emission for current gain control can be performed or not is reset (at Step St507), a V direction detection start position is determined (at Step St105). As is the case with the H direction detection position, it is desirable that the V direction detection start position is disposed at a random place per frame lest a user should visually recognize the emission for current gain control.

After the determination of the V direction detection start position, a horizontal synchronization signal (HSYNC) is detected (at Step S106), and an HSYNC counter is incremented. Next at Step St107, it is judged whether the display interval has been finished or not, and if the display interval has not been finished, the flow proceeds to Step St108.

At Step St108, the V direction detection start position determined at Step St105 is compared with the counter value of the HSYNC counter incremented at Step St106. The flow proceeds to Step St109 if the counter value of the HSYNC counter is larger than the V direction detection start position, otherwise the flow gets back to Step St106. At Step St109, it is judged in one horizontal scanning interval whether the scanning position information of the MEMS during the blanking interval obtained at Step St102 and the scanning position information of the MEMS during the present display interval are equal to each other or not, and if they are equal to each other, the flow proceeds to Step St508, otherwise the flow gets back to Step St106. At Step St508, it is judged whether the emission for current gain control can be performed or not.

Here, explanation will be made about the judgment performed at Step St508. The emission for current gain control is an emission that has a middle light amount value (referred to as a second light amount value, hereinafter) emitted by a high gradation signal (referred to as a second reference signal level, hereinafter) such as D2 shown in FIG. 18 that has a higher gradation compared with the first reference signal level D1 used for the emission for threshold current control.

Figure 18:
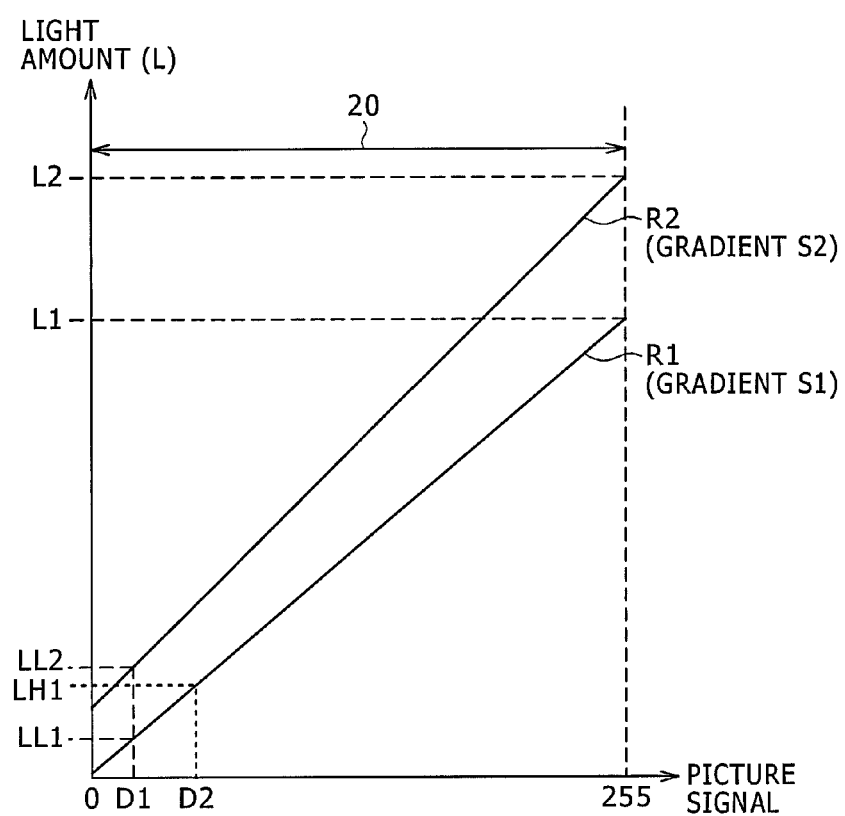
FIG. 18 is an explanation diagram showing an example of the picture signal vs. light amount of a monochromatic light source characteristic obtained in the emission processing for the current gain control of the second embodiment.

In this case, if the relation between the picture signal and the light amount is R1 state in FIG. 18, the light amount LH1 is obtained. Therefore, the second reference signal level D2 is sufficiently small compared with a picture signal displayed during the display interval, a user does not visually recognize the emission for current gain control. In addition, by setting the position of the emission for current gain control at a random place, a possibility that a user visually recognizes the emission for current gain control can be reduced.

Here, the judgment whether the emission for current gain control can be performed or not is made by obtaining a picture signal value at a picture position where the scanning position information of the MEMS during the blanking interval is equal to the scanning position information of the MEMS during the present display interval.

The picture signal value is obtained in the following way: (1) a signal value of the color corresponding to the emission color determined at Step St506 per pixel is obtained; (2) plural average values each of which is obtained by averaging signal values of several pixels (averaging signal values of 8 pixels or less pixels is desirable); and the picture signal value is set to a collection of the plural average signal values. And it is desirable that the minimum value of the plural average signal values in the picture position is twice the second reference signal level D2 or more. Alternatively, because the luminances of R and G are recognized at high rates, the picture signal value is not obtained using a signal value of the color corresponding to the emission color determined at Step St103 per pixel, but is obtained in the following way: (1) a sum of signal values of R and G per pixel is obtained; (2) plural average values each of which is obtained by averaging sums of signal values of several pixels (averaging sums of signal values of 8 pixels or less pixels is desirable); and the picture signal value is set to a collection of the plural average signal values. And it is also desirable that the minimum value of the plural average signal values in the picture position is twice the second reference signal level D2 or more.

If the above condition is satisfied, it is judged that the emission for current gain control can be performed at Step St508. Thanks to the above-mentioned control, in the case where, for example, the picture shown in FIG. 3B is displayed, the emission for current gain control is not performed during the blanking interval corresponding to the full black background, with the result that the emission for current gain control is not visually recognized by a user.

If it is judged that the emission for current gain control can be performed at Step St508, the flow proceeds to Step St111, and the V and H positions in which the emission for current gain control can be performed are stored in an emission register (at Step St111), and the emission flag for current gain control is set (at Step St509).

Using the values of the emission register in which the above V and H positions are stored and the emission flag for current gain control, the emission processing for current gain control 600 during the next blanking interval is performed. Here, if an area in which the emission for current gain control can be performed is not included in the display interval, the flow proceeds to the scene change detection processing 201 after the judgment at Step St107.

Next, the operation of the emission processing for current gain control 600 shown in FIG. 17 will be explained. First in the emission processing for current gain control 600, it is judged whether the emission flag for current gain control was set during the previous display interval or not at Step St600, and if it was set, the flow proceeds to Step St401, otherwise the flow proceeds to Step St504.

At Step St401, it is judged whether the V and H positions during the blanking interval are equal to the V and H positions stored in the emission register at Step St111 or not. If they are equal to each other, the second reference signal level D2 of a color corresponding to the emission color determined at Step St103 is sent to the current gain circuit 55, and the emission for current gain control is performed (at Step St601). On the other hand, the V and H positions during the blanking interval are not equal to the V and H positions stored in the emission register, the flow proceeds to Step St504.

After the emission for current gain control is performed (at Step St601), a light sensor output from the light sensor 11 is obtained (at Step St602), and a gradient is calculated (at Step St603). The calculation of this gradient (at Step St603) is performed with the use the second light amount value obtained at Step St602 and the first light amount value obtained at the first reference signal level D1 in the threshold current control processing 100.

If the picture signal vs. light amount characteristic shows R1 state in FIG. 18, the gradient is given by (LH1−LL1)/(D2−D1). With the gradient value obtained at Step St603, the difference between a target gradient value that is a reference value and this obtained gradient value is calculated at Step St604. Here, it is presupposed that the target gradient value has already been stored in a nonvolatile memory 9 or the like. Using this difference between the target gradient value and the obtained gradient value, a target setting value is determined (at Step St605), and the current gain control is performed.

Hereinafter, the determination method of the target setting value at Step St605 and the setting method of the current gain will be explained. As is the case with the first embodiment, the luminance of a whole screen largely changes along with large increase or large decrease in the current gain, which makes a user visually recognize the fluctuations of the screen called flickers. Especially, if the change between the picture signals of two successive frames is small, there is a high possibility that the flickers are visually recognized. Therefore, the current gain has to be incremented or decremented by the first step width that is a minimum step width so that the flickers generated by the increment or decrement of the current gain are not visually recognized by the user.

The determination method of the target setting value includes the following two steps. The first step is a step of calculating an integer n using Equation 2 ([SS/ΔS] represents the integral part of SS/ΔS).

$$n=[SS/\Delta S] \quad \text{(Equation 2)}$$

In Equation 2, ΔS is the change amount of the gradient when the current gain setting changes by the first step width. SS is the difference between the target gradient value and the obtained gradient value calculated at Step St604. The integer n is the number of executions of changing the current gain setting by the first step width. The second step is a step of making the current gain circuit 55 set the current gain by increasing or decreasing the current gain n times by the first step width with an arbitrary intervals. This determination method of the target setting value makes it possible to put the characteristic of a laser diode to a reference state without the user visually recognizing the flickers. If the above-mentioned arbitrary interval is too short, there is a possibility that the user visually recognizes the flickers, therefore it is more desirable to set the arbitrary interval to 10 seconds or longer.

Figure 17:
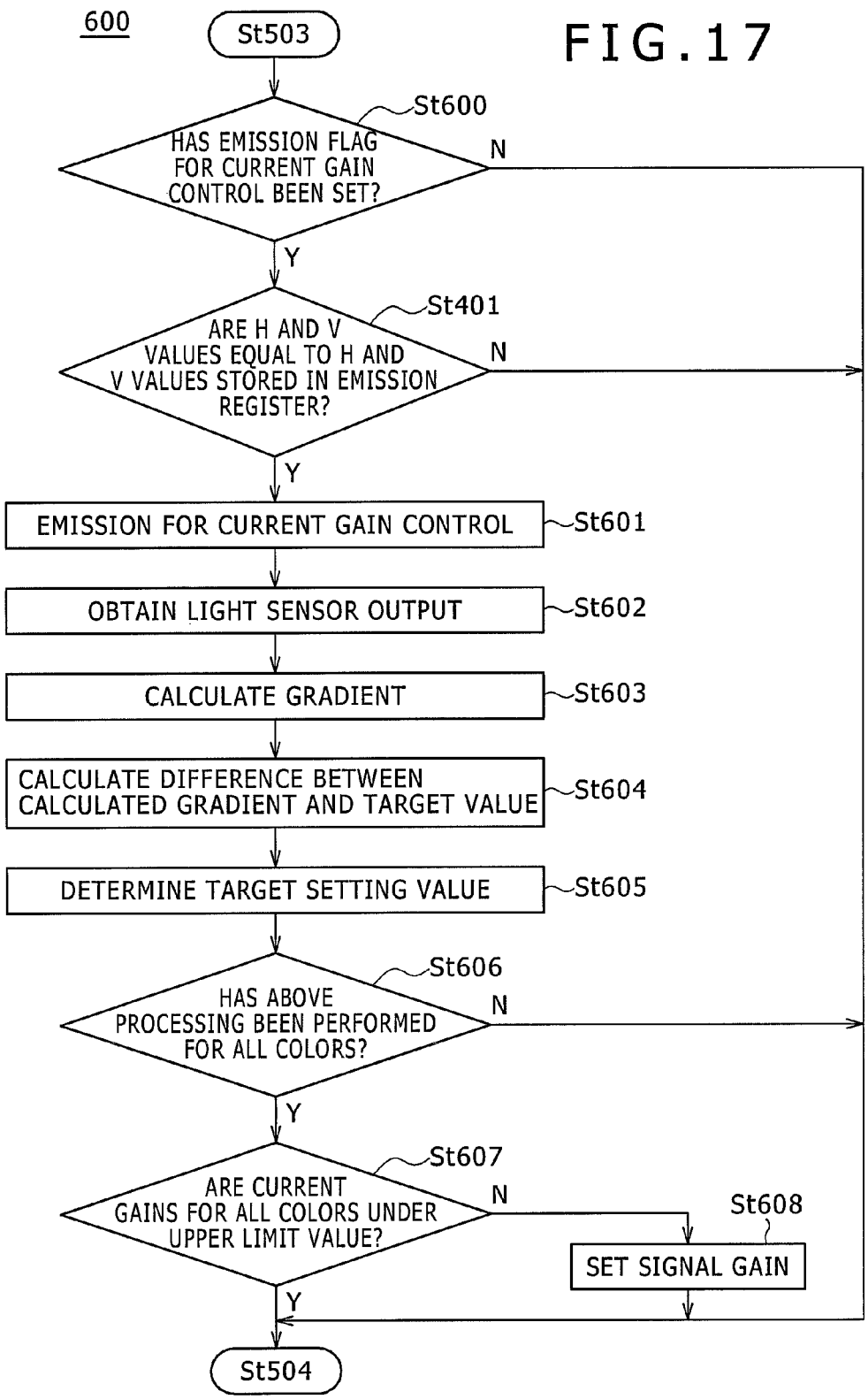
FIG. 17 is a flowchart showing the operation of emission processing for current gain control of the second embodiment.

In the flowchart shown in FIG. 17, only the determination of the target setting value that is processing of calculating the value of the above n (at Step St605) is listed, and the processing of making the current gain circuit 55 perform the current gain setting by increasing or decreasing the current gain n times by the first step width with an arbitrary intervals is omitted assuming that this processing is performed independently of the flowchart shown in FIG. 17. After the determination of the target setting value at Step St605, it is judged whether the above processing has been performed for all colors or not at Step St606. If the above processing has been performed for all colors, the flow proceeds to Step St607, otherwise the flow proceeds to Step St504.

At Step St607, it is judged whether the current gains for all colors are under the upper limit value or not. The upper limit value is the maximum current gain value that is set for the current gain value not to exceed the rated current value of the laser diode or the maximum output condition value of the laser driver. Setting this upper limit value makes it possible to prevent a current larger than the rated current from flowing through the laser diode even if the state of the laser diode cannot get close to the reference state owing to its aged deterioration.

The setting of signal gains (at Step St608) performed in the case where the current that flows through a laser diode for a certain color exceeds the upper limit value in the judgment at Step St607, that is, in the case where the state of the laser diode for the certain color cannot get close to the reference state will be described. At Step St608, gradient change amounts that are values obtained by dividing the gradients of respective colors obtained at Step St603 by the target gradient values of the respective colors are calculated.

Next, a color that has the smallest gradient change value (or that has the largest difference between its gradient obtained at Step St603 and its target gradient value) is determined. This color that has the smallest gradient change amount is set to a reference color, and the signal gain of this reference color is set to 1. Signal gains of other colors are respectively determined by dividing the gradient change amount of the reference color by the gradient change amounts of the other colors. Determining the signal gains of the colors in the above described way makes it possible that the white balance is maintained even if the state of a laser diode for a certain color cannot get close to the reference state.

To give a concrete example, if the gradient change amounts for R, G, and B are respectively 0.8, 0.9, and 1.0, the signal gain of R is set to 1.0, with the result that the signal gain of G is 0.88 (=0.8/0.9), and the signal gain of B is 0.80 (=0.8/1.0).

The signal gains obtained at Step St608 are sent to the signal gain circuit 58. A picture signal sent from the line memory 54 is multiplied by the signal gains by the signal gain circuit 58 and the calculation result is sent to the current gain circuit 55. In addition, in the case where a signal gain abruptly changes, it is desirable that the signal gain is prevented from abruptly changing so that the signal gain gradually gets close to the signal gain obtained at Step St608 as a target signal gain with an arbitrary time constant.

In addition, it should be noted that, because the processing during display interval is performed by the emission control unit 53 in FIG. 5, the processing is performed on the picture signal that is written in the frame memory. In other words, the picture signal written in the frame memory 3 is behind the picture signal, which is to be displayed and stored in the line memory 54, by one frame. Therefore, the display picture, on which whether a piece of emission processing for current gain control 600 can be performed or not is judged, is displayed in the next display interval after the piece of emission processing for current gain control 600 is performed.

In this case, it is conceivable that, by delaying the performance of the piece of emission processing for current gain control 600 by one frame while information is being held as it is, the piece of the emission processing for current gain control 600 is performed in the next blanking interval after the display interval of the display picture on which whether the piece of emission processing for threshold current control 400 can be performed or not is judged. In other words, although the flowchart of the current gain control processing 500 starts at the blanking interval start position, it is conceivable that the flowchart starts at the display interval start position by replacing the processing during blanking interval 160 by the processing during display interval 161.

In addition, although the descriptions of this embodiment have been made under the assumption that the emission for current gain control is performed once per frame, it goes without saying that it is all right to perform plural pieces of emission for current gain control at different picture positions in one frame by repeating Step St508 at which whether the emission for current gain control can be performed or not is judged and the following Steps plural times.

These are the descriptions of the second embodiment of the present invention with reference to the flowcharts shown in FIG. 15 to FIG. 17. According to this embodiment, the picture signal vs. gradient of the light amount characteristics with a threshold current as a parameter can be kept constant when there are the change of temperature and the abrupt change of load, therefore a harmful effect in that the change of the white balance of a picture or the unnecessarily bright display of the low gradation part of the picture gives uncomfortable feeling to a user can be suppressed.

Third Embodiment

Next, a third embodiment that controls the threshold current adjusting value and the current gain value using a picture attribute amount without using a light sensor or a temperature sensor. Regarding the first and second embodiments, examples, in which the state of the laser light source 5 is detected by the light sensor 10 and the temperature sensor 11 and then the threshold current adjusting values and the current gains are controlled on the basis of the detection results, have been described. In addition, a technique in which the adjustment of the threshold current and the current gain is performed at the timing of the scene change of a display picture has been disclosed.

As described above, the necessity of the adjustment of the threshold current and the current gain arise from the fact that temperature rise owing to accumulated optical conversion loss of a laser diode has an considerable effect on the temperature vs. output characteristic of the laser diode. In the third embodiment, an example in which the estimation of the temperature of the laser diode is performed through the control of display pixel accumulation of a picture signal will be explained.

Figure 19:
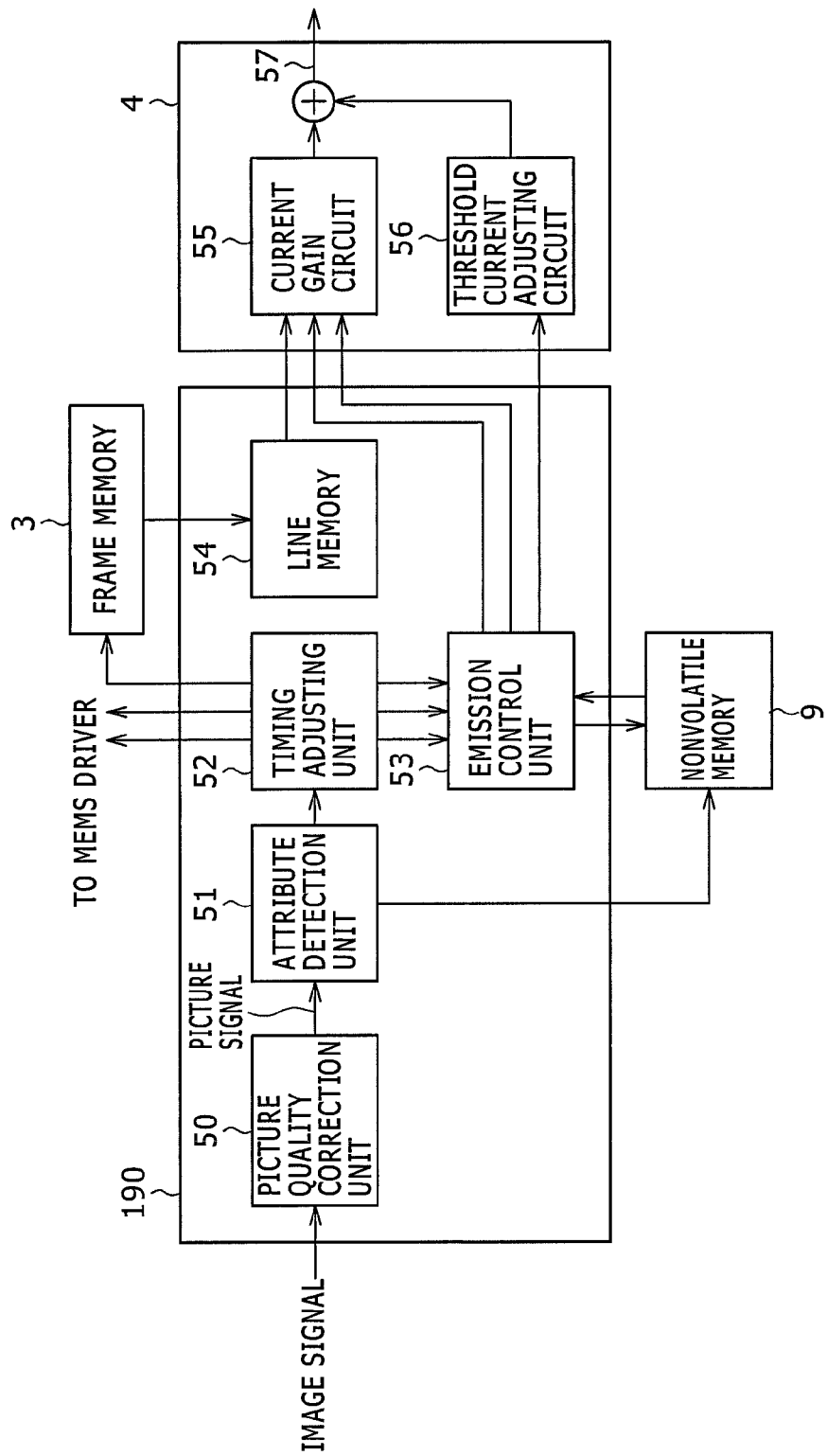
FIG. 19 is a diagram showing the details of the internal configurations of a picture processing unit and a laser driver of a third embodiment.

FIG. 19 is a diagram showing the details of the internal configurations of a picture processing unit 190 and a laser driver 4 of the third embodiment. The attribute detection unit 51 of this embodiment has a function of estimation of the temperature of a laser diode performed through the accumulation processing of pixels of a picture signal in addition to the functions of the attribute detection unit 51 of the first or second embodiment. In the third embodiment, the adjustments of the threshold current and the current gain are performed on the basis of this accumulated value of pixels, hence a light sensor and a temperature sensor are not needed.

Specifically, the ACLs of plural frames before an image frame which outputs a laser light per color are accumulated in accordance with the following equation, and an estimated temperature value corresponding to the accumulated ACL is obtained with reference to an estimation table. Subsequently, the threshold current adjusting value and the current gain adjusting value are obtained from this estimated temperature value.

$$\text{Accumulated } ACL = \Sigma \alpha i \times ACLi, \quad \text{(Equation 3)}$$

where i is the relative frame number of a previous image frame, and αi is an influence coefficient of the previous image frame i. Because αi is an influence coefficient of the previous image frame i, the influence of the previous frame i becomes smaller as the previous frame i becomes older. Therefore, αi becomes smaller as the previous frame i becomes older. Because the actual coefficient sequence is influenced by the thermal capacity of the laser diode and the setting conditions of the laser elements, it has to be tuned in accordance with the condition of the real machine.

FIG. 20 shows an example of a reference table including the relations between accumulated ACLs and estimated temperatures, and the relations between estimated temperatures and threshold current adjusting values/current gain adjusting values. In this table, the correction values of the estimated temperatures are associated with the accumulated ACLs, and the threshold current adjusting values and the current gain adjusting values are associated with the correction values of the estimated temperatures.

It goes without saying that the values shown in FIG. 20 are examples, and that these values vary depending on laser diodes and laser light sources to be used. In addition, although the correction values in FIG. 20 are relative values with the values corresponding to the ACL 10 used as standards, the notation method is not limited to this notation method. In addition, an estimated temperature is uniquely associated with an accumulated ACL in the above table, it is conceivable that a correction is made by associating a correction value with an estimated temperature and an accumulated ACL both of which are previously obtained.

Figure 21:
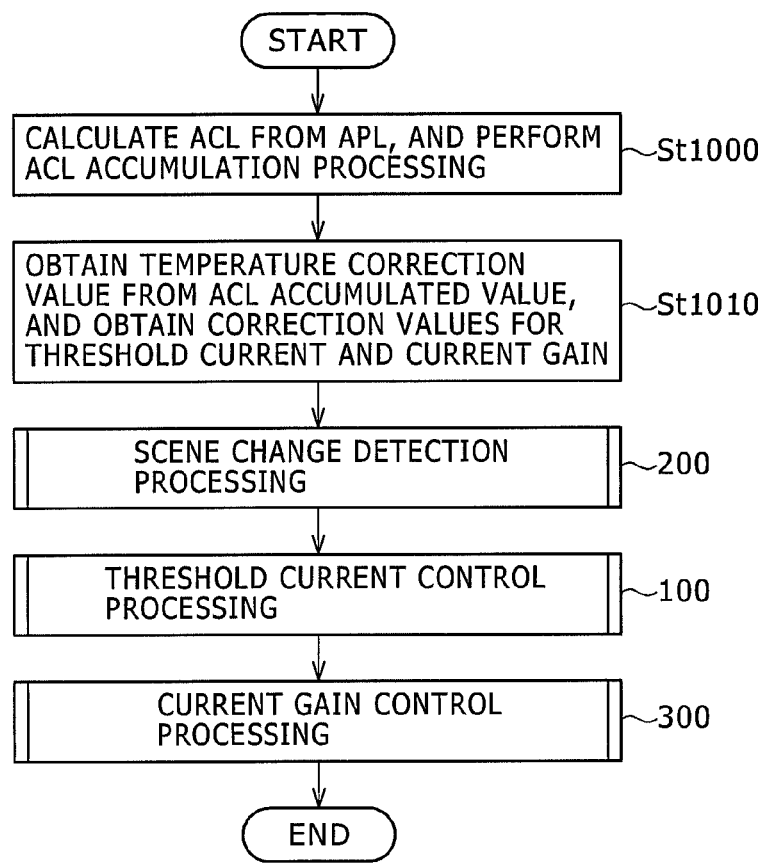
FIG. 21 is a flowchart for explaining the control contents of the third embodiment.

FIG. 21 is a flowchart for explaining the control contents of the third embodiment. An attribute detection unit 51 calculates an ACL from an APL, and performs ACL accumulation processing (at Step St1000). Next, a temperature correction value is obtained from an ACL accumulation value, and a correction value for a threshold current and a correction value for a current gain are obtained (at Step St1010). Subsequently, the above-described scene change detection processing 200, the threshold current control processing 100, and the current gain control processing 300 are performed in this order. The scene change detection processing 200, the threshold current control processing 100, and the current gain control processing 300 are performed per frame.

Although the above-described third embodiment does not need a temperature sensor 11, in order to correct the temperature of the laser diode estimated on the basis of Equation 3, it is desirable that the temperature sensor should be installed. For example, it is recommendable that the estimated temperatures in FIG. 20 are corrected in the blanking interval of the image display or periodically.

Although, in the above-described embodiments, some examples in which a picture display device is applied to a projector using the MEMS have been described, the application of the picture display device is not limited to the projector using the MEMS. The picture display device according to these embodiments can be applied to any device as long as the device employs a laser light source.

What is claimed is:

1. A picture display device comprising:
   a plurality of light sources;
   a light source drive unit that drives the light sources;
   a reflecting mirror that reflects emission lights from the light sources to project the reflected emission lights on an object;
   a mirror drive unit that drives the reflecting mirror;
   an attribute amount detection unit that detects the attribute amount of a picture signal from an input image signal;
   a scene change detection unit that detects the switching of the picture using the attribute amount of the picture signal obtained by the attribute amount detection unit;
   a light sensor that measures the light amounts of the light sources;
   a temperature sensor that measures the ambient temperatures of the light sources;
   a threshold current control unit that superimposes an image of a first reference signal level onto the input image signal during the vertical blanking interval of the input image signal, and controls a threshold current used as a parameter in the forward current vs. light amount characteristics of the light sources by a first step width in accordance with a first light amount value obtained by measuring the light amount of the input image signal onto which the image of the first reference signal level is superimposed using the light sensor;
   a current gain control unit that controls the picture signal vs. gradient of the light amount characteristics of the light sources by the first step width in accordance with the output of the temperature sensor or the attribute amount of the picture signal, the picture being projectively displayed by scanning the emission lights using the reflecting mirror, and
   wherein, when the scene change detection unit detects the switching of the picture, the picture signal vs. gradient of the light amount characteristics of the light sources with the threshold current as a parameter are controlled by a second step width that is wider than the first step width.

2. The picture display device according to claim 1, wherein the threshold current control unit controls a display position in which an image of the first reference signal level is superimposed during the vertical blanking interval so that the display position can be disposed at a random place per image frame.

3. The picture display device according to claim 1, wherein the threshold current control unit superimposes an image of the first reference signal level onto images of eight pixels or less during the vertical blanking interval so that a minimum value of the average signal levels of the images of eight pixels or less during a display interval is twice the first reference signal level or larger.

4. The picture display device according to claim 1, wherein the threshold current control unit superimposes an image of the first reference signal level onto images of eight pixels or less during the vertical blanking interval so that a minimum value of the average signal levels of the sums of R and G components of images of eight pixels or less during a display interval is twice the first reference signal level or larger.

5. The picture display device according to claim 1, wherein the attribute amount of the picture signal includes at least an APL (average picture level) of each of the light sources.

6. A picture display device comprising:
   a plurality of light sources;
   a light source drive unit that drives the light sources;
   a reflecting mirror that reflects emission lights from the light sources to project the reflected emission lights on an object;
   a mirror drive unit that drives the reflecting mirror;
   an attribute amount detection unit that detects the attribute amount of a picture signal from an input image signal;
   a scene change detection unit that detects the switching of the picture using the attribute amount of the picture signal obtained by the attribute amount detection unit;
   a light sensor that measures the light amounts of the light sources;
   a threshold current control unit that superimposes an image of a first reference signal level onto the input image signal during the vertical blanking interval of the input image signal, and controls a threshold current used as a parameter in the forward current vs. light amount characteristics of a light sources by a first step width in accordance with a first light amount value obtained by measuring the light amount of the input image signal onto which the image of the first reference signal level is superimposed using the light sensor;
   and a current gain control unit that superimposes an image of a second reference signal level onto the input image signal during the vertical blanking interval of the input image signal, and controls the picture signal vs. gradient of the light amount characteristics of the light sources by the first step width in accordance with a second light amount value obtained by measuring the light amount of the input image signal onto which the image of the second reference signal level is superimposed using the light sensor and the first light amount value, the picture being projectively displayed by scanning the emission lights using the reflecting mirror,
   wherein, when the scene change detection unit detects the switching of the picture, the gradients of the picture signal vs. light amount characteristics of the light sources with the threshold current as a parameter are controlled by a second step width that is wider than the first step width.

7. The picture display device according to claim 6, wherein the threshold current control unit controls a display position in which an image of the first reference signal level that is superimposed during the vertical blanking interval so that the display position can be disposed at a random place per image frame, and wherein the current gain control unit controls a display position in which an image of the second reference signal level that is superimposed during the vertical blanking interval so that the display position can be disposed at a random place per image frame.

8. The picture display device according to claim 6,
wherein the threshold current control unit superimposes an image of the first reference signal level onto images of eight pixels or less during the vertical blanking interval so that a minimum value of the average signal levels of the images of eight pixels or less during a display interval coincides with the display position of twice the first reference signal level or larger, and
wherein the current gain control unit superimposes an image of the second reference signal level onto images of eight pixels or less during the vertical blanking interval so that the minimum value of the average signal levels of the images of eight pixels or less during the display interval is twice the second reference signal level or larger.

9. The picture display device according to claim 6,
wherein the attribute amount of the picture signal includes at least an APL (average picture level) of each of the light sources.

10. A picture display device comprising:
a plurality of light sources;
a light source drive unit that drives the light sources;
a reflecting mirror that reflects emission lights from the light sources to project the reflected emission lights on an object; a mirror drive unit that drives the reflecting mirror;
an attribute amount detection unit that detects the attribute amount of a picture signal from an input image signal;
a scene change detection unit that detects the switching of the picture using the attribute amount of the picture signal obtained by the attribute amount detection unit;
a light sensor that measures the light amounts of the light sources;
a temperature sensor that measures the ambient temperatures of the light sources;
a threshold current control unit that superimposes an image of a first reference signal level onto the input image signal during the vertical blanking interval of the input image signal, and controls a threshold current used as a parameter in the forward current vs. light amount characteristics of the light sources by a first step width in accordance with a first light amount value obtained by measuring the light amount of the input image signal onto which the image of the first reference signal level is superimposed using the light sensor; and
a current gain control unit that controls the picture signal vs. gradient of the light amount characteristics of the light sources by the first step width in accordance with the output of the temperature sensor or the attribute amount of the picture signal, the picture being profectively displayed by scanning the emission lights using the reflecting mirror, wherein the picture signal vs. gradient of the light amount characteristics of the light sources with the threshold current as a parameter are controlled.

11. The picture display device according to claim 10,
wherein the threshold current control unit controls a display position in which an image of the first reference signal level is superimposed during the vertical blanking interval so that the display position can be disposed at a random place per image frame.

* * * * *